US009196084B2

(12) United States Patent
Boardman et al.

(10) Patent No.: US 9,196,084 B2
(45) Date of Patent: Nov. 24, 2015

(54) DETERMINING OBJECT VOLUME FROM MOBILE DEVICE IMAGES

(71) Applicant: URC Ventures, Inc., Redmond, WA (US)

(72) Inventors: David Boardman, Redmond, WA (US); Charles Erignac, Kirkland, WA (US); Srinivas Kapaganty, Suwanne, GA (US); Jan-Michael Frahm, Chapel Hill, NC (US); Ben Semerjian, Portland, OR (US)

(73) Assignee: URC Ventures Inc., Redmond, WA (US)

( * ) Notice: Subject to any disclaimer, the term of this patent is extended or adjusted under 35 U.S.C. 154(b) by 97 days.

(21) Appl. No.: 13/843,833

(22) Filed: Mar. 15, 2013

(65) Prior Publication Data

US 2014/0270480 A1    Sep. 18, 2014

(51) Int. Cl.
| | |
|---|---|
| *G06T 7/00* | (2006.01) |
| *G06T 17/00* | (2006.01) |
| *G01B 11/00* | (2006.01) |
| *G06T 7/60* | (2006.01) |

(52) U.S. Cl.
CPC ............... *G06T 17/00* (2013.01); *G01B 11/00* (2013.01); *G06T 7/0065* (2013.01); *G06T 7/602* (2013.01)

(58) Field of Classification Search
None
See application file for complete search history.

(56) References Cited

U.S. PATENT DOCUMENTS

| | | | |
|---|---|---|---|
| 5,831,621 A | * | 11/1998 | Pito ............................... 345/419 |
| 7,944,547 B2 | | 5/2011 | Wang |
| 8,384,714 B2 | | 2/2013 | De Aguiar et al. |

(Continued)

FOREIGN PATENT DOCUMENTS

WO    2012/061945 A1    5/2012

OTHER PUBLICATIONS

Reinhard Koch, Marc Pollefeys, and Luc Van Gool "Realistic Surface Reconstruction of 3D Scenes from Uncalibrated Image sequences", 2000, The Journal of Visualization and Computer Animation, 11:115-127.*

(Continued)

*Primary Examiner* — Siamak Harandi
(74) *Attorney, Agent, or Firm* — Seed IP Law Group PLLC

(57) ABSTRACT

Techniques are described for analyzing images acquired via mobile devices in various ways, including to estimate measurements for one or more attributes of one or more objects in the images. For example, the described techniques may be used to measure the volume of a stockpile of material or other large object, based on images acquired via a mobile device that is carried by a human user as he or she passes around some or all of the object. During the acquisition of a series of digital images of an object of interest, various types of user feedback may be provided to a human user operator of the mobile device, and particular images may be selected for further analysis in various manners. Furthermore, the calculation of object volume and/or other determined object information may include generating and manipulating a computer model or other representation of the object from selected images.

37 Claims, 14 Drawing Sheets

(56) References Cited

U.S. PATENT DOCUMENTS

| | | |
|---|---|---|
| 2002/0145607 A1 | 10/2002 | Dimsdale |
| 2002/0190982 A1* | 12/2002 | Kotcheff et al. ............. 345/420 |
| 2003/0218607 A1* | 11/2003 | Baumberg ................... 345/419 |
| 2007/0132874 A1* | 6/2007 | Forman et al. ........... 348/333.02 |
| 2007/0263907 A1 | 11/2007 | McMakin et al. |
| 2008/0031512 A1 | 2/2008 | Mundermann et al. |
| 2008/0100622 A1 | 5/2008 | Gordon |
| 2008/0180448 A1 | 7/2008 | Anguelov et al. |
| 2011/0221936 A1 | 9/2011 | Steinberg et al. |
| 2012/0044247 A1 | 2/2012 | Naimark |
| 2012/0133665 A1 | 5/2012 | Wexler et al. |
| 2013/0048722 A1 | 2/2013 | Davis et al. |
| 2013/0060540 A1 | 3/2013 | Frahm et al. |

OTHER PUBLICATIONS

Lynx A Camera by Lynx Laboratories—Kickstarter, retrieved on Mar. 13, 2013, from http://www.kickstarter.com/projects/915328712/lynx-a-camera, 16 pages.

Lynx Laboratories, retrieved on Mar. 13, 2013, from http://lynxlaboratories.com/object.php, 4 pages.

Lynx Laboratories, retrieved on Mar. 13, 2013, from http://lynxlaboratories.com/aboutLynxA.php, 2 pages.

* cited by examiner

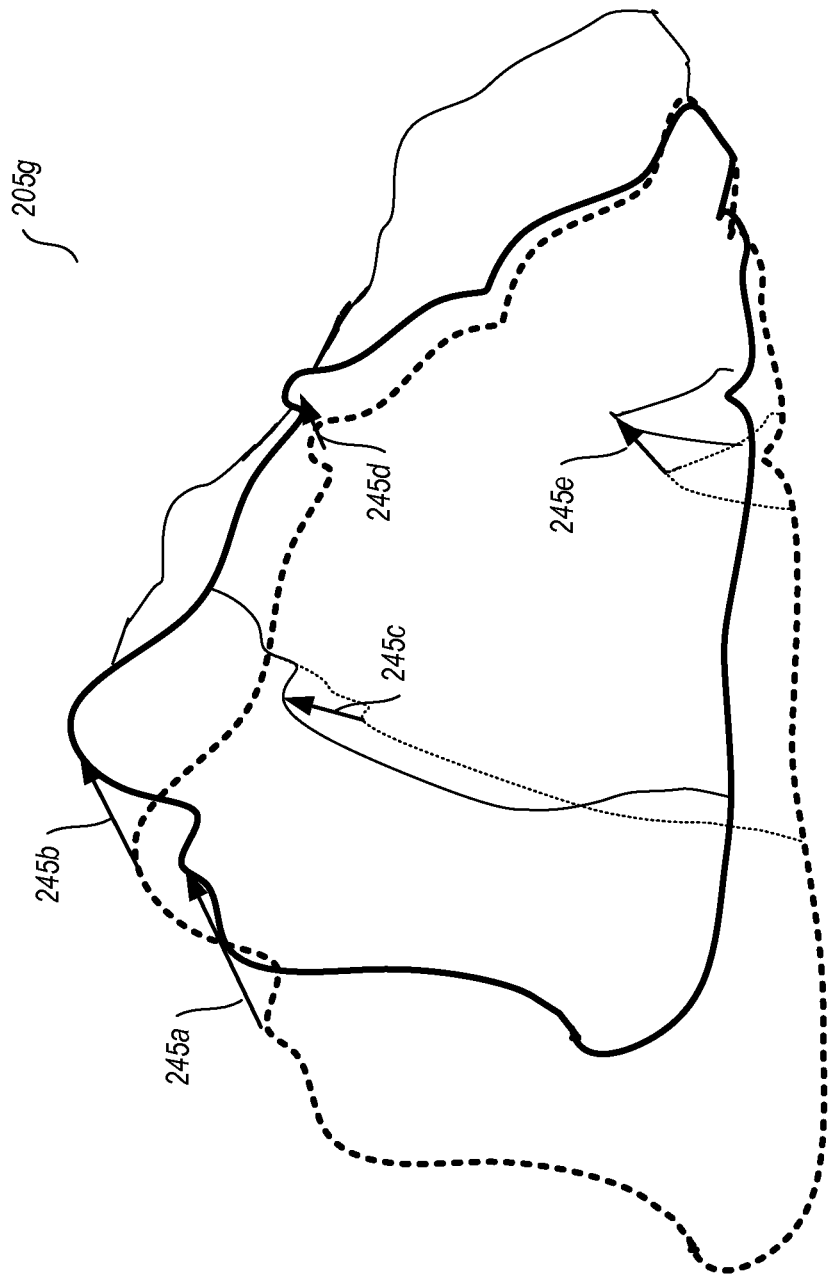

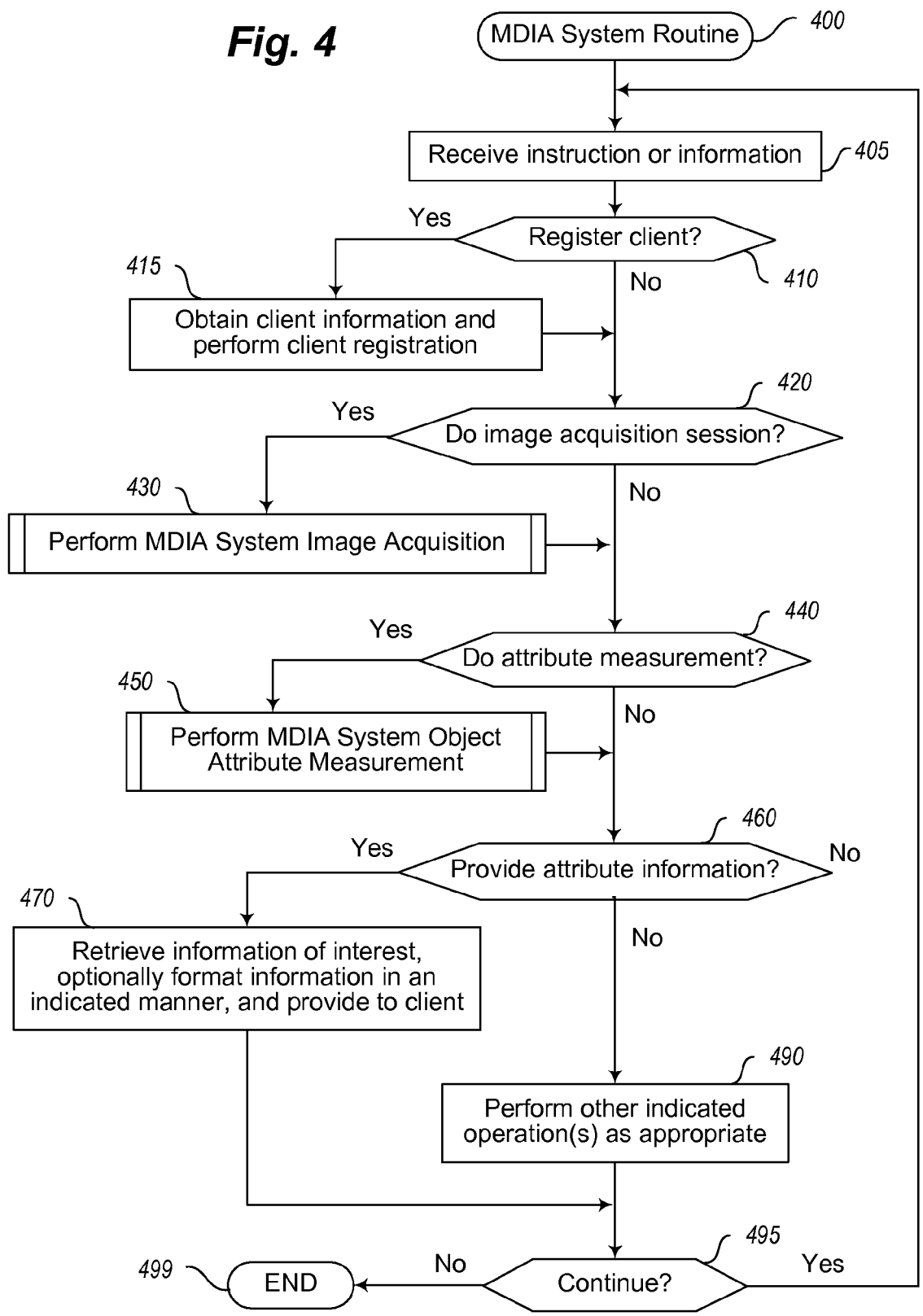

DETERMINING OBJECT VOLUME FROM MOBILE DEVICE IMAGES

TECHNICAL FIELD

The following disclosure relates generally to techniques for analyzing images acquired via mobile devices, such as to assess volume or other attributes of an object included in the images.

BACKGROUND

A variety of techniques exist to identify and measure attributes of physical objects from locations separate from those objects, including for man-made and naturally occurring objects in outdoors environments. Such identification and measurement techniques may, for example, use various types of specialized measurement equipment (e.g., theodolites, rangefinders, radar, lidar, sonar, 3D scanners, etc.). However, such techniques have various problems, including that the specialized measurement equipment may be expensive and/or difficult to use, and that some types of object attributes are difficult to measure.

Portable electronics equipment is becoming increasingly inexpensive and includes increasingly advanced technology, including for many consumer electronics devices. However, such devices do not typically include specialized or dedicated measurement equipment to identify and measure attributes of physical objects.

BRIEF DESCRIPTION OF THE DRAWINGS

FIGS. 2A-2H illustrate examples of acquiring images of an object via a mobile device and analyzing the acquired images to assess volume and/or other attributes of the object.

FIG. 4 is an example flow diagram of an illustrated embodiment of a Mobile Device Image Analysis (MDIA) System routine.

DETAILED DESCRIPTION

Techniques are described for analyzing images acquired via mobile devices in various ways, including in some embodiments to estimate measurements for one or more attributes of one or more objects included in the images. As one example, the described techniques may in some embodiments be used to measure the volume of a stockpile of material (e.g., a construction aggregate, such as sand, gravel, crushed stone, etc.), based on images acquired via a mobile device that is carried by a human user as he or she passes around some or all of the stockpile—such a mobile device may, for example, include a digital camera that takes individual digital photo images and/or digital video consisting of successive frames of digital images, or a mobile device with communication and/or computing capabilities that also includes a digital camera or other digital image acquisition capabilities (e.g., a smart phone or other cell phone, a tablet computer, a pad computer, a slate computer, etc.). During the acquisition of a series of digital images of an object of interest, various types of user feedback and/or other instructions may in some embodiments be provided to a human user who is operating the mobile device acquiring the digital images, such as based on monitoring quality and/or other aspects of some or all of the digital images being acquired, including to assist the human user in improving future digital images to be acquired. In addition, the selection of particular images to use from a series of digital images of an object of interest may be performed in various manners in various embodiments, including to select a subset of the digital images of the series while the digital images are being acquired and/or after all of the digital images are acquired, such as based on measured quality and/or other assessments of the selected images. Furthermore, the calculation of object volume and/or other estimated object attribute measurements may be performed in various manners in various embodiments, including to generate a 3D (three-dimensional) computer model of the object from the selected images, and to perform various types of manipulations and/or analyses of the generated 3D model. Additional details related to acquiring images via mobile devices and to analyzing such images in particular manners are described below, and some or all of the described techniques are performed in at least some embodiments by automated operations of a Mobile Device Image Analysis ("MDIA") system.

Figure 1:
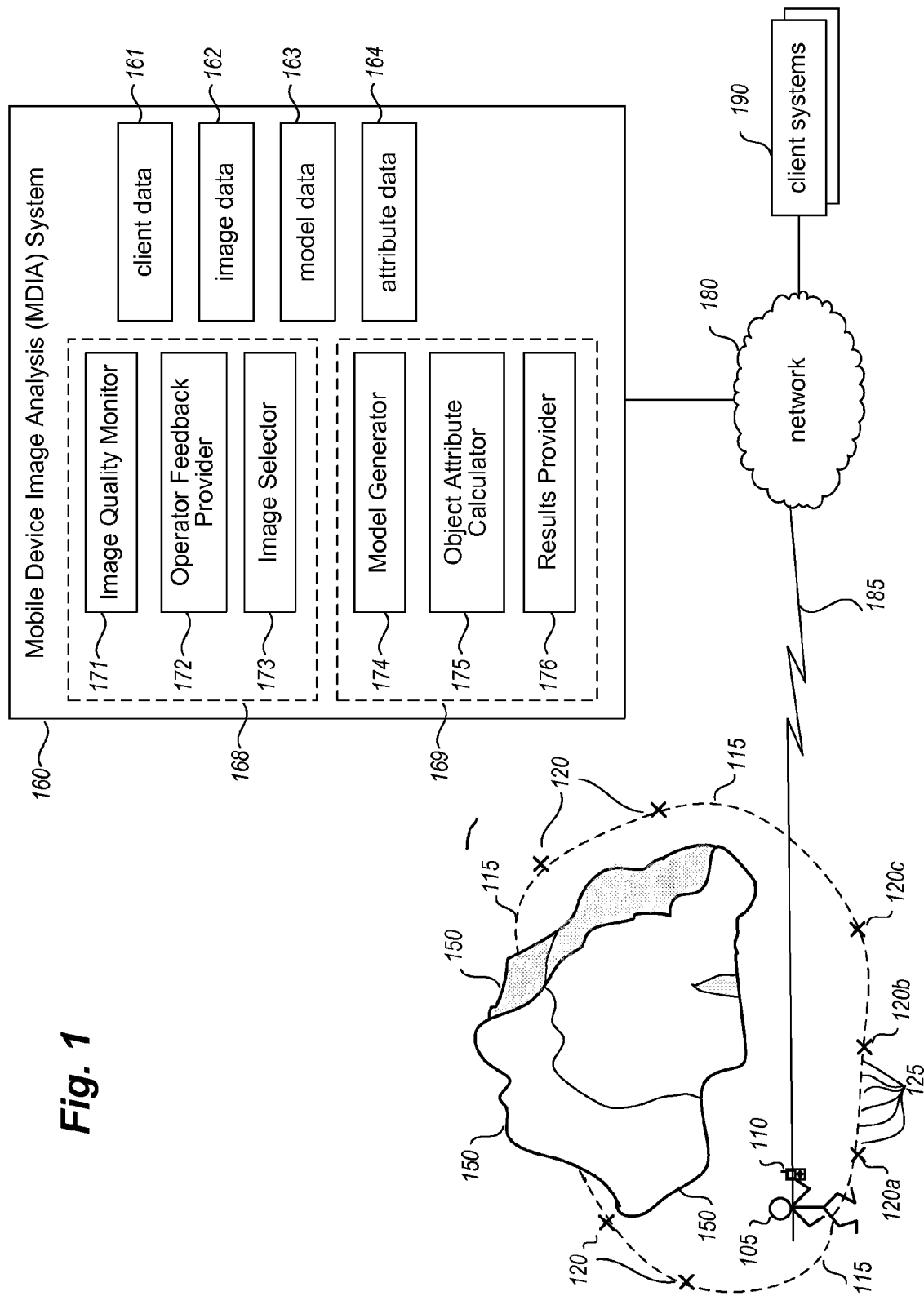
FIG. 1 is a network diagram illustrating an example embodiment of using described techniques to acquire images of an object via a mobile device and to analyze the acquired images to assess volume and/or other attributes of the object.

As noted above, in at least some embodiments, the described techniques include automated operations to select, while a series of digital images of an object of interest are being acquired, particular digital images from the series to use to represent the object (such as a subset of the digital images in the series, although in other embodiments and situations all digital images of the series may be selected and used)—such automated image selection operations may be performed in at least some embodiments by one or more image acquisition modules of the MDIA system that execute as part of a software application on the mobile device, with an MDIA system Image Selector module being one example of such a module, as discussed in greater detail below with respect to FIG. 1 and elsewhere. In other embodiments, such MDIA system image acquisition module(s) may instead execute on one or more other computing devices and communicate with the mobile device and/or with the operator, such as on another associated computing device in the vicinity of the mobile device (e.g., a mobile computing device carried by the operator of the mobile device acquiring the digital images, with such an associated computing device optionally being in communication with the mobile device acquiring the digital images via a wireless and/or wired/cable connection). After a group of such particular digital images (also referred to herein as "images") are selected, they may be analyzed in various manners to represent the object and to determine corresponding information about the object, as discussed in greater detail elsewhere herein.

As one example of selecting particular images for the group while the images are being acquired, a human user or other operator of the mobile device that is used in acquiring the images (also referred to herein as "the mobile device") may begin to acquire one or more initial images of an object of interest, such as from a first general location in the vicinity of the object at which the operator is standing or otherwise located (e.g., on the ground or other same base surface as the object). If at least one of the initial images of interest satisfy minimum quality standards (e.g., with respect to resolution; contrast; lighting; inclusion of all or a minimum amount of the object; an amount of absolute or relative motion, such as with respect to one or more preceding images; etc.), one of those satisfactory initial images may be selected as a first image of the group, with that selected image representing a ground-based view of the exterior of the object from the first location. That selected image may also be added as a first item in a temporary image queue that is used to select additional images to add to the group. Additional details are included below related to assessing images to determine if they satisfy minimum standards of quality, with at least some corresponding image quality monitoring automated operations being performed by one or more of the MDIA system image acquisition modules in some embodiments, such as a MDIA system Image Quality Monitor module, as discussed in greater detail with respect to FIG. 1 and elsewhere.

As the operator of the mobile device continues to encircle the object by moving to different locations around the exterior of the object, additional images are acquired (whether automatically by the MDIA system image acquisition module(s), such as continuously or periodically or as otherwise determined, or instead based on manual actions of the operator to acquire images at particular locations and/or times, optionally in response to instructions from the MDIA system image acquisition module(s)). The additional images are added as additional items in the image queue (optionally after verifying that the additional images being added satisfy the minimum standards of quality, although such minimum standards of quality may not be assessed at the time of adding images to the queue in some embodiments). The inclusion of additional images in the queue continues until the MDIA system image acquisition module(s) determine that a sufficient quantity of images have been added to the image queue—such a determination may be made in a variety of manners in various embodiments, such as based on a quantity of queue items, an amount of time elapsed since the first item in the queue was acquired, an amount of distance traveled (or other change in location) since the first item in the queue was acquired, an amount of change in a portion of the object exterior that is shown between two or more images in the queue (e.g., to ensure that at least a minimum overlap exists in the object exterior portions between the first and last images in the queue, such as to both include at least one or some other minimum number of common features and/or areas in the images), an aggregate size of the items in the queue, etc.

After a sufficient quantity of images have been added to the image queue, one or more images may be selected from the image queue to be added to the group, and other non-selected images in the image queue that precede such selected images in the queue may be discarded or otherwise excluded from inclusion in the group, although in some embodiments even the non-included images may be retained outside the queue for further use. In addition, the most recent newly selected image may be used as a new first item in the image queue, with any earlier images in the queue being removed from the queue, and optionally with some or all of the other images in the queue (if any) after the new first item being retained in the queue. The selection of one or more particular images from the queue to include in the group may be performed in various manners in various embodiments, including by evaluating some or all of the images included in the queue to select one or more images with a highest score based on one or more metrics (e.g., one or more quality standard metrics, and/or one or more metrics that measure an amount of overlap or other relationship between an image being evaluated and the first image in the queue). Additional details are included below related to evaluating multiple images with respect to one or more metrics.

After the selection of one or more images from the queue and corresponding modification to the image(s) remaining in the queue that result from selecting a new first queue item, the process of acquiring additional images to add to the image queue may repeat one or more additional times, until a sufficient group of images has been selected to satisfy any overall object acquisition criteria (e.g., to cover all of the exterior of the object, to cover a specified portion of the object exterior, etc.). After the process of selecting the group of images to represent the object has been completed, those images in the group may be further analyzed by one or more object attribute measurement modules of the MDIA system (e.g., one or more MDIA system object attribute measurement modules that execute on one or more remote server computing systems), including in some embodiments to transmit or otherwise provide only the selected images of the group to those object attribute measurement modules, although in other embodiments some or all other of the acquired images may also be provided to those object attribute measurement modules—such transmission or other providing of images may incur in various manners, including to use wireless capabilities (e.g., a cellular telephone network, satellite transmissions, WiMax or other wide-area wireless computer networks, etc.) of the mobile device and/or of an associated configured device, and/or to use wired/cabled capabilities (e.g., by moving the mobile device to a location that includes wired/cabled networking capabilities, and physically attaching the mobile device to an available port or other connection).

Additional details are included below related to techniques for selecting particular images for the group in a dynamic manner concurrently with image acquisition.

As noted above, in at least some embodiments, the described techniques further include automated operations to select, after a series of images of an object of interest have been acquired, particular images from the series to use as part of a group that represents the object, such as instead of performing image selection dynamically and concurrently with the image acquisition—such automated image selection operations may be performed in at least some embodiments by one or more of the MDIA system image acquisition modules that execute as part of a software application on the mobile device and/or on other associated configured devices, such as a MDIA system Image Selector module, and may include selecting a subset of the images in the series or all of the images.

As one example of selecting particular images for the group after the images have been acquired, a human user or other operator of the mobile device may first travel around some or all of the exterior of the object in order to acquire the series of images, such as in a manner similar to that described above with respect to acquiring the series of images while concurrently selecting particular images for the group. In some embodiments, some or all of the acquired images may be assessed with respect to one or more minimum standards of quality (e.g., in a manner to that discussed above with respect to acquiring the series of images while selecting particular images for the group), whether during the acquisition of the images or after all of the images of the series are acquired, such as to discard or otherwise exclude any images from further consideration if they fail to satisfy such standards (although such minimum standards of quality may not be assessed at this time in some embodiments). The remaining images in the series are then supplied to an MDIA system Image Selector module for further analysis—if such a module is executed on one or more remote server computing systems, the supplying of the remaining images may include transmitting or otherwise providing the remaining images to those remote server computing systems.

The selection of the images for the group further includes evaluating some or all of the images of the series to select multiple images based on one or more metrics (e.g., one or more quality standard metrics, and/or one or more metrics that measure an amount of overlap or other relationship between two or more of the images)—the selection of the multiple images may include selecting a sufficient group of images to satisfy any object acquisition criteria (e.g., to cover all of the exterior of the object, to cover a specified portion of the object exterior, etc.). As one example, the images of the series may be evaluated to determine degrees of overlap with each other, such as to identify pairs of images having at least a minimum overlap in the object exterior portions of those images (e.g., both include at least one or some other minimum number of common features in the images). Graph information may then be generated for the images in the series, with each node in the graph representing one of the images, and each edge between two nodes corresponding to an identified pair of images with sufficient overlap. Optionally, cost information of one or more types may then be associated with some or all of the edges and/or with some or all of the nodes, such as for cost information for an edge to correspond to a degree of overlap for the identified pair, and/or for cost information for a node or edge to correspond with another determined aspect (e.g., a cost score for an image based on a quality score for an image with respect to one or more quality standard metrics). A shortest path through the graph may then be determined, using any specified cost information (e.g., using least cost path planning), with the images associated with the nodes along the shortest path being the selected images for the group—in determining the path, a first node in the path may be a selected initial image from the acquired images (in a manner similar to that discussed above for selecting initial images concurrently with acquisition of the series of images), and a last node in the path may be one of the final images (or any other image) from the acquired images that is selected in a similar manner.

Additional details are included below related to techniques for selecting particular images for the group by evaluating the images after the image acquisition has been completed.

As is also noted above, in at least some embodiments, the described techniques include automated operations to, while a series of digital images of an object of interest are being acquired, provide instructions or other feedback to a human user operator of the mobile device—such automated user feedback operations may be performed in at least some embodiments by one or more of the MDIA system image acquisition modules, with an MDIA system Operator Feedback Provider module being one example of such a module, as discussed in greater detail below with respect to FIG. 1 and elsewhere. For example, during the image acquisition, some or all of the images that are acquired may be assessed with respect to one or more quality standard metrics, as discussed elsewhere, including to determine if a minimum threshold or other minimum criteria is satisfied. Such user instructions or feedback may be performed based at least in part on such image quality assessment, including to assist in improving the additional images that are acquired for the series, whether from additional locations along the exterior of the object and/or based on re-acquiring one or more images of the series (e.g., images that fail to satisfy minimum quality standards). Thus, for example, if a particular acquired image fails to satisfy minimum quality standards, the MDIA system Operator Feedback Provider module may generate and provide feedback to the user via the mobile device and/or an associated configured device related to the image quality problems. Such feedback may, for example, indicate only that an image that was just acquired has problems without providing additional details, or instead may indicate additional details (e.g., a type of quality problem, instructions of how to improve corresponding quality of additional images acquired in the future, instructions to reacquire one or more images whose quality was not sufficiently high and optionally instructions for how to do so, instructions for how to modify a light level and/or position of the user to improve quality, etc. Such feedback information may be provided in various manners in various embodiments, including via audible information (e.g., tones, spoken information, etc.), visual information (e.g., displayed text, a warning light, etc.), or other feedback mechanisms (e.g., vibration or other haptic mechanisms).

In other embodiments, the types of feedback or other instructions provided may have other forms. For example, information may be provided to a human user operator related to his/her positioning (e.g., to be nearer to or farther from the object, to be higher or lower relative to the object, to go to a specified location, etc.), and/or regarding the use of other capabilities (e.g., to add a light source, to add information of known size to enable a scale determination, to add information to enable slope or other orientation information to be determined, etc.). In addition, in some embodiments, feedback or other instructions provided via the automated operations may include settings or parameters to be used for the image acquisition (e.g., shutter speed, lens aperture, zoom level, etc.), whether by providing such information to a human user operator to manually set on the mobile device, or by automatically setting some or all such parameters on the mobile device. Furthermore, in some embodiments and situations in which the operator of the mobile device is not a human (e.g., an automated vehicle or other mobile device or system), the feedback or other instructions provided may further control the operator in additional manners, such as to direct the operator to one or more specified locations, to direct where and how to point or otherwise orient the image acquisition capabilities of the mobile device, when to acquire images, etc.

Additional details are included below related to techniques for generating and providing feedback to an operator of a mobile device.

After the process of selecting the group of images to represent the object has been completed, whether concurrently with image acquisition or after image acquisition has been completed, further automated operations are performed to analyze those selected images in the group by one or more object attribute measurement modules of the MDIA system (e.g., one or more MDIA system object attribute measurement modules that execute as part of a software application on the mobile device or on one or more remote server computing systems), such as an MDIA system Object Attribute Calculator module, as discussed in greater detail below with respect to FIG. 1 and elsewhere. In at least some embodiments, such further automated operations include generating one or more computer models or other computer representations of the object, such as a 3D point cloud model, a bare earth model, a polygon mesh model, a 2½D model, one or more surface models (e.g., based on NURBS, or non-uniform rational B-splines; T-Splines; or other curved representations of surface topology) or other solid models, etc. Such generated models may then be used to determine one or more of various characteristics of the object, including to calculate the object volume and/or to estimate other attribute measurements, to determine contour lines for the object surface and otherwise identify surface attributes, to determine a type and/or class of material of the object, to determine color information and/or other surface feature information (and to optionally modify one or more of the generated models to include and display such information), etc. Non-exclusive examples of attributes of an object that may be calculated or otherwise estimated include volume, surface area, height (e.g., maximum height, an average height, etc.), length (e.g., maximum length along a longest identified radial axis, average length in one or more directions, etc.), width (e.g., maximum width along a radial axis perpendicular to the longest identified radial axis in the x-y plane, average width in one or more directions, etc.), weight (e.g., based on volume and a unit weight for a specified amount of a determined material for the object), radioactivity (e.g., based on volume and a unit radioactivity for a specified amount of a determined material for the object), monetary value or cost (e.g., based on volume and a unit value/cost for a specified amount of a determined material for the object), etc.

Additional details are included below related to techniques for calculating an object volume and/or determining other types of object information.

After the process of calculating an object volume and/or determining other types of object information has been completed, further automated operations may be performed to provide information about the determined object information by one or more object attribute measurement modules of the MDIA system, such as an MDIA system Results Provider module, as discussed in greater detail below with respect to FIG. 1 and elsewhere. For example, when the analysis of an object is performed by the MDIA system on behalf of a client of the MDIA system (e.g., in exchange for fees charged by the MDIA system to the client), the MDIA system may generate one or more reports for the client or otherwise provide corresponding information to the client. Such reports or other information may, for example, be provided in a manner specified by a client, and may be delivered to the client in various manners (e.g., sent to the mobile device or an associated computing device of the operator for display; retrievable by an authorized user of the client from one or more server computing systems of the MDIA system; printed or otherwise distributed in non-electronic manners; etc.).

In addition, the information that is determined for one or more objects may in some embodiments and situations be used in manners other than to provide corresponding information to a client of the MDIA system, such as to provide information about particular objects and/or aggregated information about multiple objects (e.g., objects in a geographic area, objects of a particular type, etc.) to one or more external entities (e.g., in exchange for fees charged by the MDIA system to the external entities).

Additional details are included below related to techniques for generating and providing information about objects of interest to clients and/or other entities.

In addition, while some of the example embodiments discussed herein include a stockpile or other pile of material, other types of objects may be assessed in a similar manner in at least some embodiments, including buildings and other man-made structures, cavities in the ground or other negative spaces, etc. Furthermore, an object of interest being assessed may be of various types of materials, such as for a stockpile or other pile to include materials of various types and sizes (e.g., construction aggregates, grain or other product, sawdust, logs, tires, trash, recyclable materials, etc.). In addition, images that are acquired may be of various types and resolutions, including still images and/or video image frames, and may capture various types of light or other energy (e.g., visible light, infrared, ultraviolet, radioactivity, etc.).

Furthermore, while some of the example embodiments discussed herein include analyzing a single object at a single time, the described techniques may be used in other manners in some embodiments. For example, a single object may be analyzed at different times, such as to further enable relative information for the object to be determined over time (e.g., to determine how a stockpile object grows and/or shrinks over time with respect to volume or one or more other attributes), with corresponding information made available to a client and/or used for further automated determination of related information. In addition, in at least some embodiments, multiple objects (e.g., nearby, on top of each other in whole or in part, behind or in front of each other in whole or in part, etc.) may be analyzed together in a series of images that are acquired, such as by traversing all of the multiple objects, and optionally traversing other portions of individual objects (e.g., for objects on top of each other in whole or in part).

For illustrative purposes, some embodiments are described below in which specific types of images are acquired for specific types of objects, and in which specific types of object attributes are estimated in particular manners. However, it will be understood that such described techniques may be used with other types of objects and images and for other types of object attributes in other manners in other embodiments, and that the invention is thus not limited to the exemplary details provided.

FIG. 1 is a diagram illustrating an example embodiment of an MDIA ("Mobile Device Image Analysis") System 160 that may be used to provide functionality to one or more clients related to the analysis of images acquired via mobile devices, such as to calculate volume or otherwise measure attributes of interest of one or more objects included in the acquired images. The MDIA System 160 may be provided via one or more network-accessible configured devices, whether via one or more configured server computing systems or other configured systems (not shown) that are remote from a user representative 105 of a client, and/or based on configured use of one or more mobile devices 110 used by the user representative 105. A server computing system in such an example may include any computing device or system that may receive data and/or requests, and take corresponding actions (e.g., store the data, respond to the request, etc.), as discussed in greater detail elsewhere herein.

In particular, in this example, a user representative 105 is carrying a mobile device 110 that includes image acquisition capabilities (e.g., one or more cameras) and includes communication capabilities to enable a transmission 185 of information from the mobile device 110 to other systems (e.g., other remote server computing systems providing at least some of the MDIA System 160), such as via a cellular telephone network or other transmission method. In other embodiments, the image data that is captured by such a mobile device 110 may be provided to other systems in other manners, such as via a physical cable or other physical connection (e.g., after the image acquisition for an object in an environment is completed). In addition, in some embodiments, some or all of the image data captured by a mobile device 110 may be first transmitted to another nearby computing device, such as another nearby computing device carried by the operator or located in a nearby location (e.g., a nearby vehicle or building), and then transmitted from the nearby computing device to or more remote server computing systems or other remote systems—such a transmission from the mobile device to the nearby computing device may occur, for example, via a physical connection (e.g., a cable, wire or other connector), via a wireless transmission (e.g., Bluetooth, infrared, near field communications, a wireless transmission mechanism with a limited transmission range, etc.), etc.

In this example, a stockpile object 150 (e.g., consisting of construction aggregate material) is shown, such as in an outdoors environment, and the user representative 105 is proceeding to encircle some or all of the exterior of the stockpile object 150 in order to obtain various images of the stockpile exterior. For example, the user may travel a path 115 around the exterior of the object, whether based on a path selected wholly by the user or instead based at least in part on user feedback or instructions provided by the MDIA System 160 to the user. The user and/or the mobile device may further acquire a variety of images to encompass the exterior of the object during the travelling of the path. As one example, the user may occasionally manually activate the image acquisition capabilities of the mobile device 110, such as at a variety of locations 120 around the exterior along the traversal path 115. As another example, the user may travel the path 115 and the mobile device may automatically acquire such images at such locations, such as based on a period of time elapsing since the last image, a distance traveled by the user since the last image, or other information related to the images that have been previously captured. Alternatively, the mobile device may acquire image data in a continuous or substantially continuous manner, such as to shoot video that includes successive image frames in rapid succession (e.g., 30 frames a second, 1 frame a second, 1 frame every 5 seconds, etc.). Thus, for example, various of the images acquired may instead occur at relatively close intervals, such as those illustrated with respect to locations 125 (while the locations 125 are not illustrated throughout the entire exterior of the object, it will be appreciated that such substantially continuous image acquisition may be performed at the same rate for some or all of the traversal of the object exterior).

The mobile device 110 may further transmit some or all of the acquired images to the MDIA System 160, such as via transmission 185 over one or more networks 180, including to be stored in image data 162. After a group of images have been selected to represent an object, the MDIA System 160 may further perform processing to generate one or more models or other representations to represent the object, such as a 3D point cloud model, a bare earth model, a surface model, etc., and may store corresponding information in model data 163. After the one or more models have been generated, the MDIA System 160 may further estimate or otherwise measure one or more attribute values for the object 150, and store such information with attribute data 164. In addition, one or more clients of the MDIA System 160 may provide various client data 161 to the MDIA System 160, such as related to types of data of interest to be generated for the client. Such clients and their authorized representative users may, for example, use various client computing systems 190 to communicate with the MDIA System 160 over one or more networks 180, such as to perform registration activities and/or to obtain results of object attribute measurements performed for the client. The data 161-164 may be stored in various manners, such as all or in part on the mobile device 110, all or in part on one or more server computing systems remote from the mobile device 110, on one or more storage systems separate from the configured devices that execute some or all of the modules of the MDIA System 160, etc.

The MDIA System 160 in this example includes various modules 171-176, which may perform various automated operations of the MDIA System 160. In some embodiments, some or all of the modules 171-176 may execute on one or more server computing systems (or other computing systems) remote from the object 150, while in other embodiments one or more of the modules 171-176 may instead execute on one or more configured devices of the user representative 105, including the mobile device 110. For example, the Image Quality Monitor module 171, Operator Feedback Provider module 172, and Image Selector module 173 may optionally be grouped as part of an image acquisition sub-system 168 of the system 160, with some or all of those image acquisition modules being executed on the mobile device. In addition, the Model Generator module 174, Object Attribute Calculator module 175, and Results Provider module 176 may optionally be grouped as part of an object attribute measurement sub-system 169 of the system 160, with some or all of those object attribute measurement modules being executed on one or more server computing systems remote from the mobile device. It will be appreciated that the functionality of the MDIA System 160 may be structured in other manners in other embodiments, including to have more or less modules and/or to have more or less functionality than is described in this example.

The Image Selector module 173 may be configured to perform automated operations to select some or all of the images that are acquired by the mobile device 110, for use as the group of images to represent the object 150, whether concurrently with the acquisition of the images or after all of the images have been acquired—if the Image Selector module 173 executes on the mobile device 110 (or other device of the user 105 that is associated with the mobile device 110, such as a smart phone that obtains image data from a mobile device camera and transmits the image data to remote servers), and if image data for object 150 is to be transmitted over the network(s) 180 to one or more remote server computing systems, the amount of bandwidth used for the transmission may be reduced in such a situation, as only the selected group of images (or information extracted from the images of the selected group and/or from other images) may be transmitted. In other embodiments, all of the acquired images (or all that satisfy minimum quality standards) may instead be transmitted to one or more remote server computing systems for further analysis, including in embodiments in which the Image Selector module 173 executes on those remote server computing systems and selects some or all of the acquired images after the item acquisition session has been completed.

The Image Quality Monitor module 171 may be configured to perform further automated operations for acquired images in at least some embodiments, such as to monitor image quality with respect to one or more metrics of interest, and to take corresponding actions if sufficient quality is not sustained. In addition, the module 171 may in some embodiments assist in providing feedback or other instructions to the user related to image quality problems that are detected if the module 171 executes concurrently with the image acquisition, such as by providing corresponding information to the Operator Feedback Provider module 172. For example, the Operator Feedback Provider module may be configured to perform further automated operations that include providing feedback to the user in various manners while the user 105 is travelling the path 115, such as when image quality problems are detected or to provide other types of information.

The Model Generator module 174 may be configured to perform further automated operations to, after the group of images to represent the object 150 has been selected and are available in the image data 162, analyze the images of the selected group and generate one or more corresponding models or other representations, such as to generate a point cloud model for the object, to apply a bare earth model and/or a surface model to the point cloud model, etc. In some embodiments and situations, some or all of the generated models may be 3D models (e.g., for a point cloud model), while in other embodiments and situations, some or all of the generated models may have other forms (e.g., 2½D representations)—use of the term "model" herein is intended to include any representation of data for an object, unless otherwise indicated. The Object Attribute Calculator module 175 may be configured to perform further automated operations to, after the one or more models are generated, use the generated model(s) to measure values for one or more attributes of interest of the object 150, such as a volume attribute or other related attributes. After the attribute information of interest is generated, the Results Provider module 176 may then be used to provide corresponding attribute measurement information to the client, such as by generating a report that includes results information and sending it to a client system 190 and/or the mobile device 110, or instead to provide such information in other manners (upon later request by the client, such as to enable the client to login to the MDIA System and to review results of previously analyzed objects).

While the example of FIG. 1 involves a single device (mobile device 110) and a single sensor (a camera or other imaging capability) to capture data regarding the object 150, in other situations and embodiments multiple devices and/or sensors may be used. As one example, different devices and/or sensors may be used to acquire different types of data (e.g., simultaneously), and the mobile device and/or remote server computing systems may combine or otherwise use such different types of data—non-exclusive examples of types of data that may be acquired include image data in one or more light spectrums, non-light energy data, location data (e.g., via GPS), depth or distance data to the object, color data, sound data, etc. In addition, in some embodiments and situations, different devices and/or sensors may be used to acquire the same or overlapping types of data (e.g., simultaneously), and the mobile device and/or remote server computing systems may combine or otherwise use such different types of data, including to determine differential information for a type of data. For example, the mobile device may include GPS capabilities (or other location determination capabilities), and one or more other devices in the environment (such as one or more devices in a fixed location) may similar include GPS capabilities (or other location determination capabilities), to enable a position of the mobile device at a given time to be determined more accurately by tracking relative differences in the differing GPS data (e.g., to eliminate minor transitory variations or fluctuations from a GPS satellite or other common source of the GPS data). Such differential information may similarly be determined for some or all of the other types of data that may be captured. In addition, information such as GPS data or other location data may further be used to determine additional information about an object, such as to assist in determining scale information for the object—as one example, location data at different locations on a path or other exterior around the object may be used determine information about the width and/or length of the object, whether alone or in combination with additional data about depth or other distance measurements of the mobile device (or other device or sensor) to the object at particular such locations.

It will be appreciated that the details discussed with respect to FIG. 1 are provided for illustrative purposes, and that the described techniques are not limited to these example details.

FIGS. 2A-2H illustrate various example images that may be acquired with respect to an object of interest (e.g., such as for the stockpile object 150 of FIG. 1), as well as corresponding analysis of the images that may be performed in at least some embodiments.

Figure 2A:
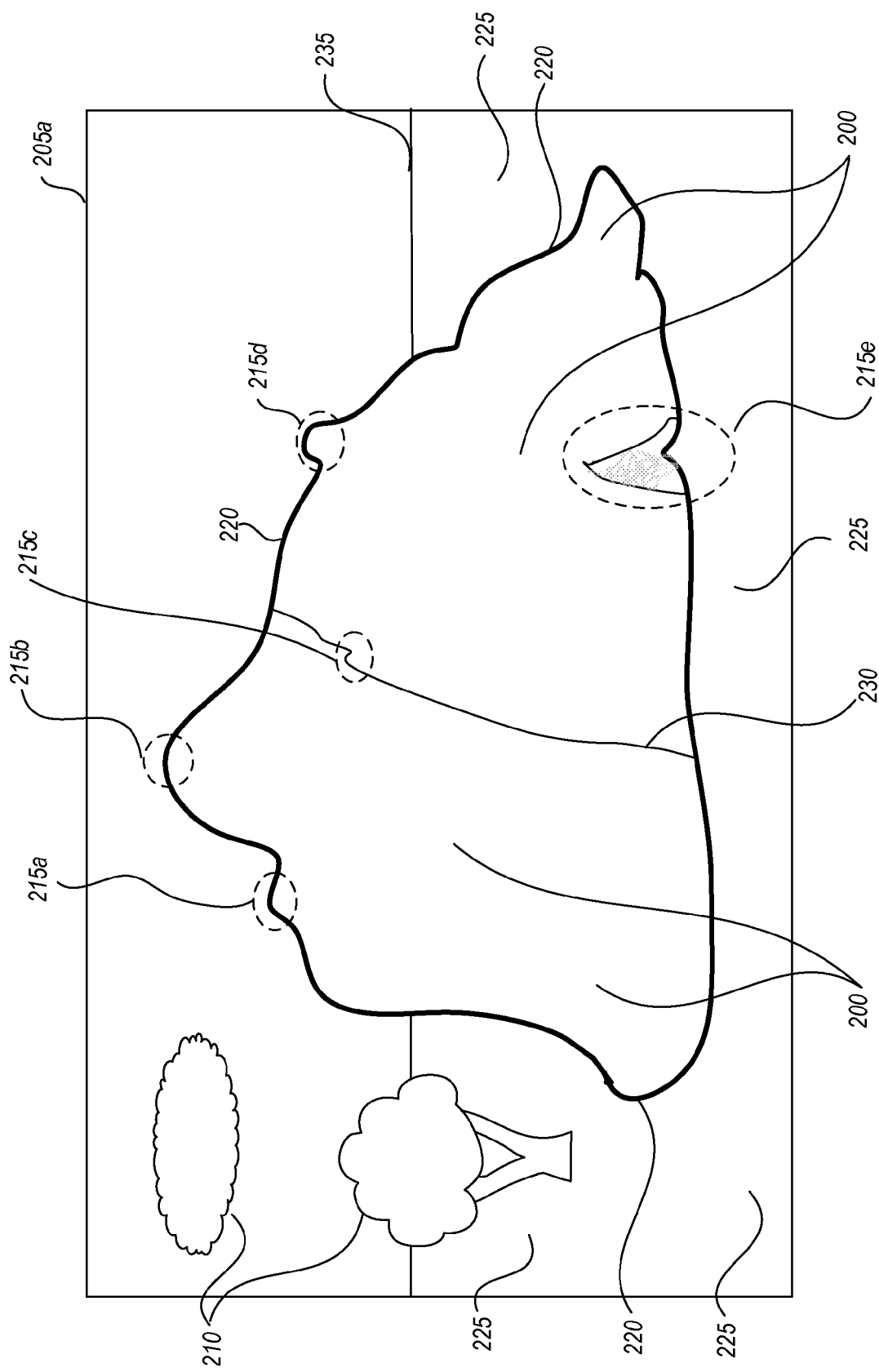

With respect to FIG. 2A, an example image 205*a* is shown, which includes a side view of an object 200, with the object in this example representing a stockpile of construction aggregate materials (e.g., object 150 of FIG. 1). The image 205*a* further includes additional information that is not part of the object 200, such as other objects 210 (in this example a tree and a cloud), a base surface 225 on which the object 200 and at least some other objects (e.g., the tree 210) rest, a horizon line 235, etc.—it will be appreciated that the surface 225 may in some situations be flat and level, while in other situations the surface may be sloped or otherwise irregular.

In addition, in this example, the exterior of the stockpile object 200 may include various visible aspects, at least some of which are shown in the image 205*a*, and which may be detectable via an automated analysis of the image. For example, the surface of the object 200 may have varying textures, colors, and shades (although colors and textures are not illustrated in this example, and shading is shown only with respect to feature 215*e*), such as to reflect a type of material of the object, position of the sun or other lighting source, an angle of the object surface with respect to the viewpoint location of the imaging device, etc. In addition, the surface of the object 200 may have various irregularities or other features that may be identified in the image and used to track changes between images—in this example, various example features 215 are illustrated. Such features may include, for example, points along a top of a silhouette or other outline 220 of the object, such as feature 215*b* at an overall peak of the object 200, and feature 215*a* that corresponds to a local high point of the outline. In addition, other example features include feature 215*d* along the outline 220 of the object 200, such as based on its distinctive shape, feature 215*c* along a ridge line 230 of the object surface 220 that is not part of the object outline (from this view), feature 215*e* that indicates a local cavity or indentation on a portion of the surface (with shading added to show that it may have a darker color relative to other surrounding parts of the surface), etc. While feature 215*e* provides one example of a feature on the surface of the pile, a variety of other types of surface features may similarly be identified and used, including, for example, based on differing colors, shading, textures, angles, curvature, lack of continuity, etc. between different locations on the surface; based on cavities, indentation, protrusions, protuberances, lines, or other shapes; based on changes from one material type to another; etc. It will be appreciated that a variety of types of features may be identified and selected in various manners, including in a manner specific to the type of image analysis that is performed.

Figure 2B:
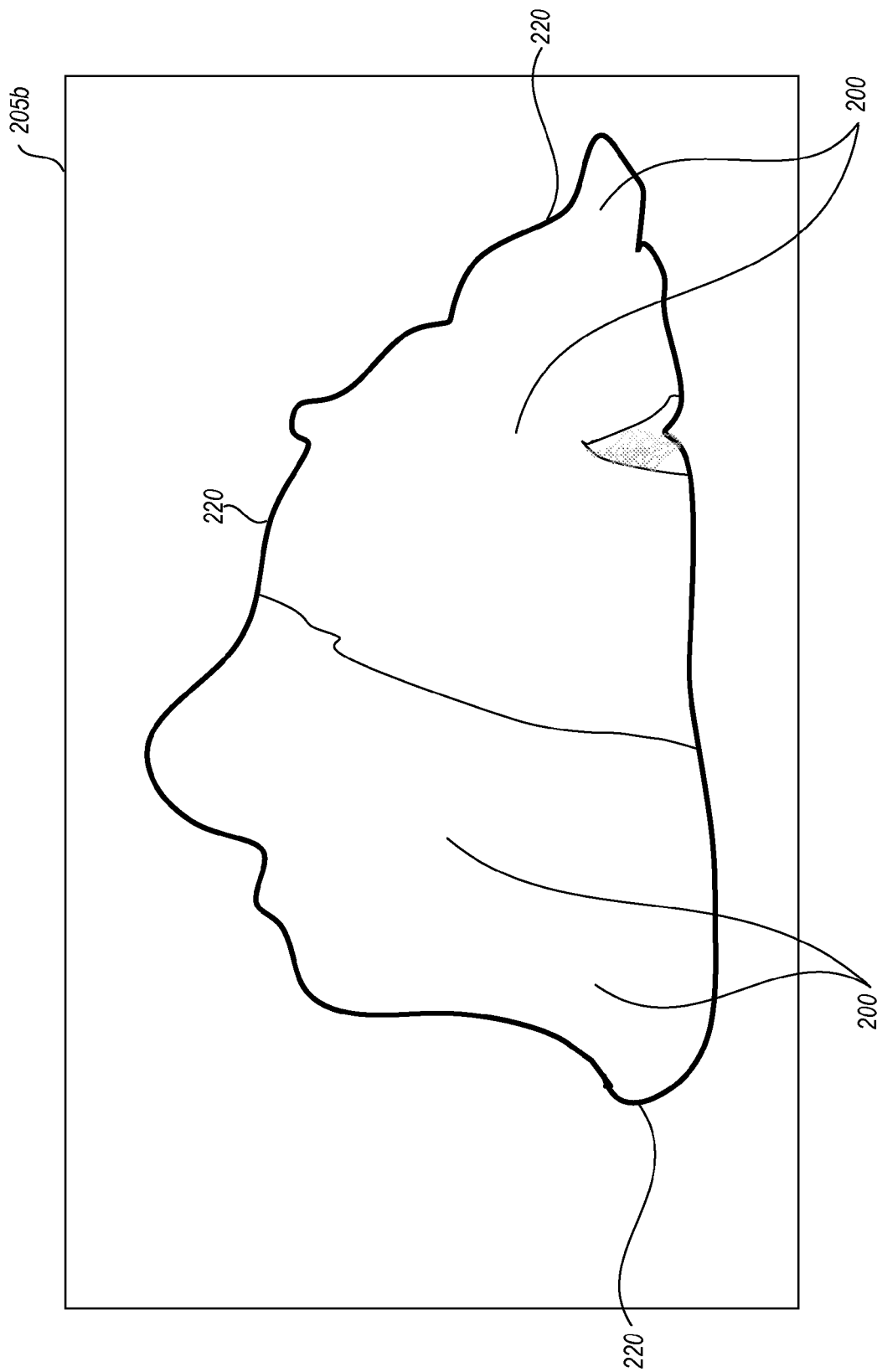

FIG. 2B continues the example of FIG. 2A, and in particular illustrates and example of an image 205*b* based on image 205*a* of FIG. 2A, but in which data for a portion of the image corresponding to the object 200 is shown, while data for other portions of the image have been removed, such as based on analysis of the image 205*a*. In other embodiments, such a separation of an object portion of the image from non-object portions of the image may not be performed at all, or may be performed at a time of generation of a corresponding model.

Figure 2C:
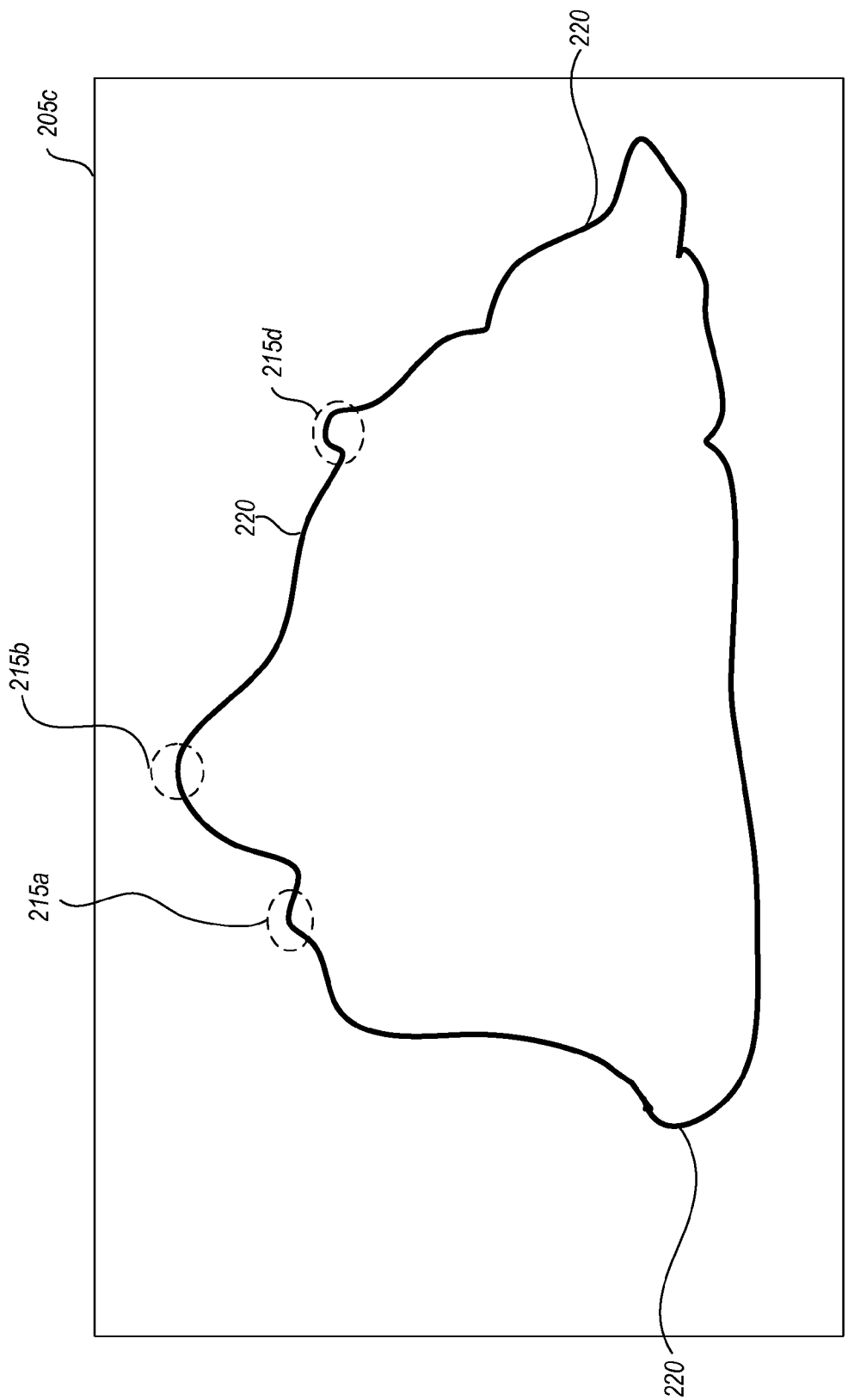

FIG. 2C continues the examples of FIGS. 2A-2B, and in this example illustrates an image 205*c* based on image 205*a* of FIG. 2A, but in which only a portion of the information about the object 200 is available. In particular, in this example, only outline information 220 for the object 200 is shown, such as if lighting conditions prevent other surface features from being visible, and/or based on a type of image analysis (e.g., line detection) that is performed. It will be appreciated that some embodiments may not use such outline information, while other embodiments may do so. In this example, the outline information of FIG. 2C still allows some current features of the object to be identified, such as features 215a, 215b, and 215d—however, surface-related portions of the object are not visible in this example, such as ridge line 230 and features 215c and 215e.

Figure 2D:
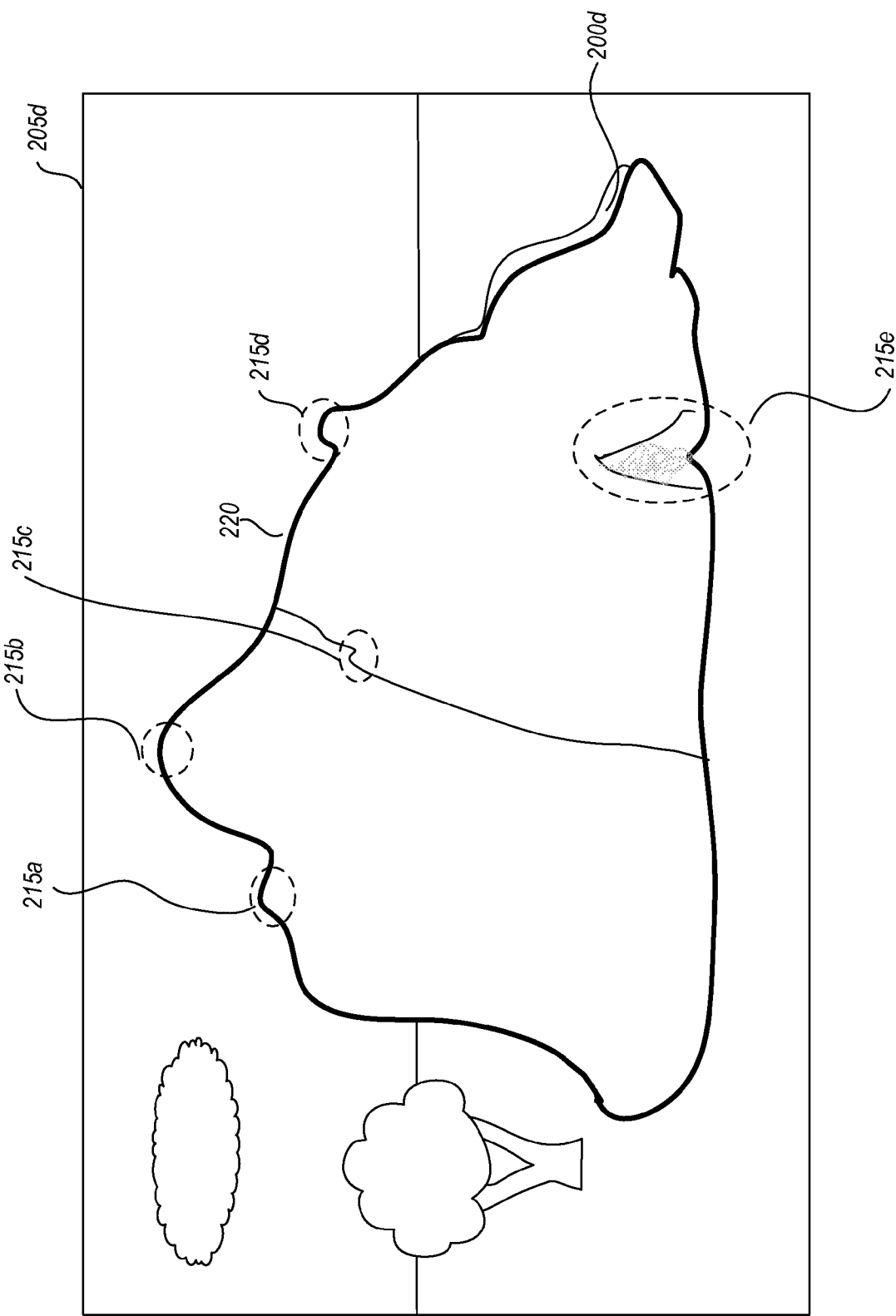

FIG. 2D continues the examples of FIGS. 2A-2C, and includes an example of a successive image 205d that may be acquired for the object 200 from a location very near that of the location at which image 205a of FIG. 2A was acquired, such as to correspond to one of the locations 125 illustrated in FIG. 1 relative to an initial starting location 120a (e.g., if image 205d is a digital image frame from a video taken by the mobile device that is near a frame corresponding to image 205a of FIG. 2A in the sequence of acquired frames). In the example of FIG. 2D, the image 205d varies only slightly as the user operator of a mobile device begins to move to the right, such as to illustrate a slight additional portion 200d of the object. Accordingly, at a time of image selection for the group of images to represent the object 200, only one of images 205a and 205d may be selected, such as due to a relatively small amount of additional information available in the second of the two images relative to the first of the two images.

Figure 2E:
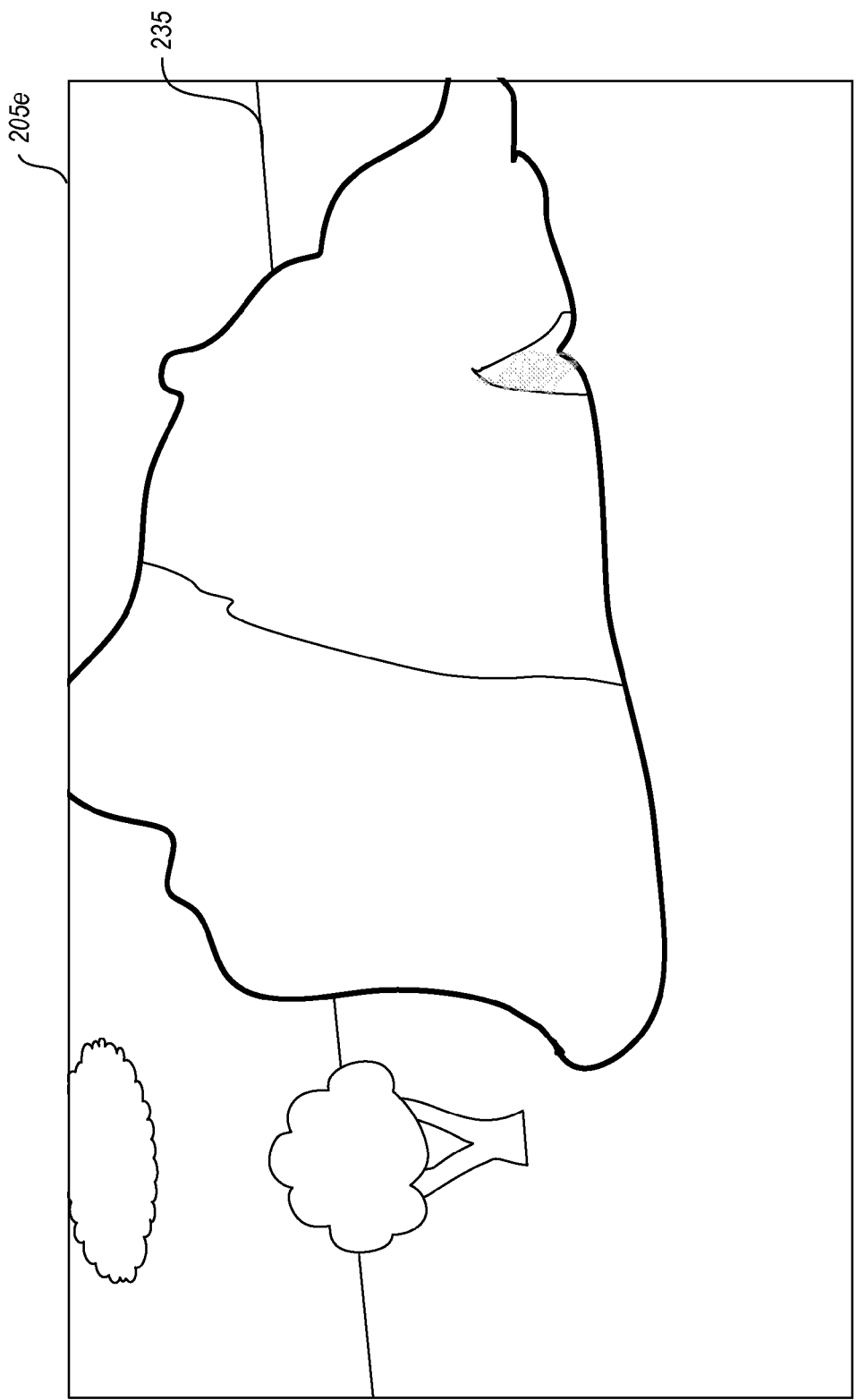

With respect to FIG. 2E, it illustrates an example of an image 205e similar to that of image 205a of FIG. 2A, but in which the image 205e has one or more quality problems, such as due to improper operator movement or positioning of the mobile device when taking the image 205e. In particular, as is illustrated in Figure 205e, the image 205e is tilted (e.g., as illustrated by the horizon line 235), and one or more portions of the object 200 have not been captured in the image due to improper positioning of the mobile device capturing the image. Accordingly, for such an example image 205e, if image monitoring is being performed, the quality of the image may be determined to be below a specified threshold or to otherwise not meet one or more specified quality criteria, such as with respect to degree of motion between images and/or for other reasons, and the image 205e may be discarded from further consideration due to that failure. In addition, or alternatively, user feedback may be provided to the user based on the detected quality problems with image 205e (e.g., shortly after acquiring the image 205e), such as to indicate one or more of the problems that exist with respect to the Figure 205e. For example, one or more of a variety of feedback messages may be displayed or otherwise indicated to the user, such as, for example, "user motion too fast", "image contrast too low", "object not centered in image", "mobile device tilted", etc.

Figure 2F:
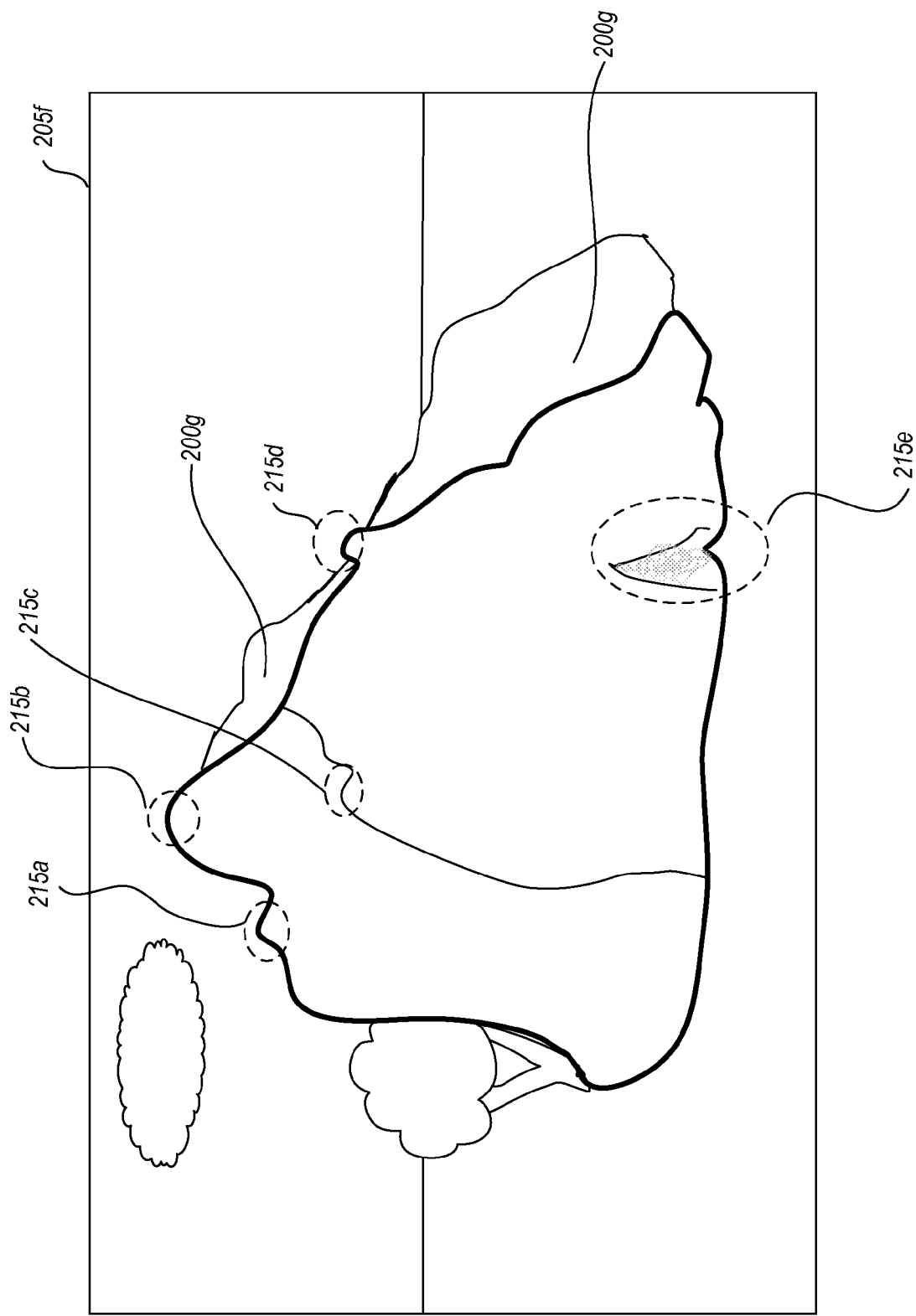

FIG. 2F continues the examples of FIGS. 2A-2E, and in particular illustrates an image 205f. In this example, the image 205f continues to correspond to object 200, but from a different viewpoint than that used for image 205a of FIG. 2A, such as from location 120b of FIG. 1. In this example, all of the features 215a-215e continue to be visible in image 205f, along with an additional portion 200g of the object 200 relative to that of image 205a, based on the change in location.

FIG. 2G continues the examples of FIGS. 2A-2F, and in particular provides a view 205g that combines portions of images 205a and 205f of FIGS. 2A and 2F, such as to illustrate relative changes between features 215a-215e from those images. In particular, outlines of the object 200 from both images are shown overlaid on each other in view 205g, with dotted lines being used for the outline from image 205a, and with solid lines being used for the outline from image 205f. In addition, arrows 245a-e have been added corresponding to features 215a-215e, respectively, to show an amount of movement of those features between the two images. Such information may be used in various manners, including to determine an amount of apparent motion between the images (e.g., based on the movement of the mobile device and/or the mobile device's operator), an amount of overlap between images and/or additional portions of the object exterior that may be available from one image to another, etc.

Figure 2H:
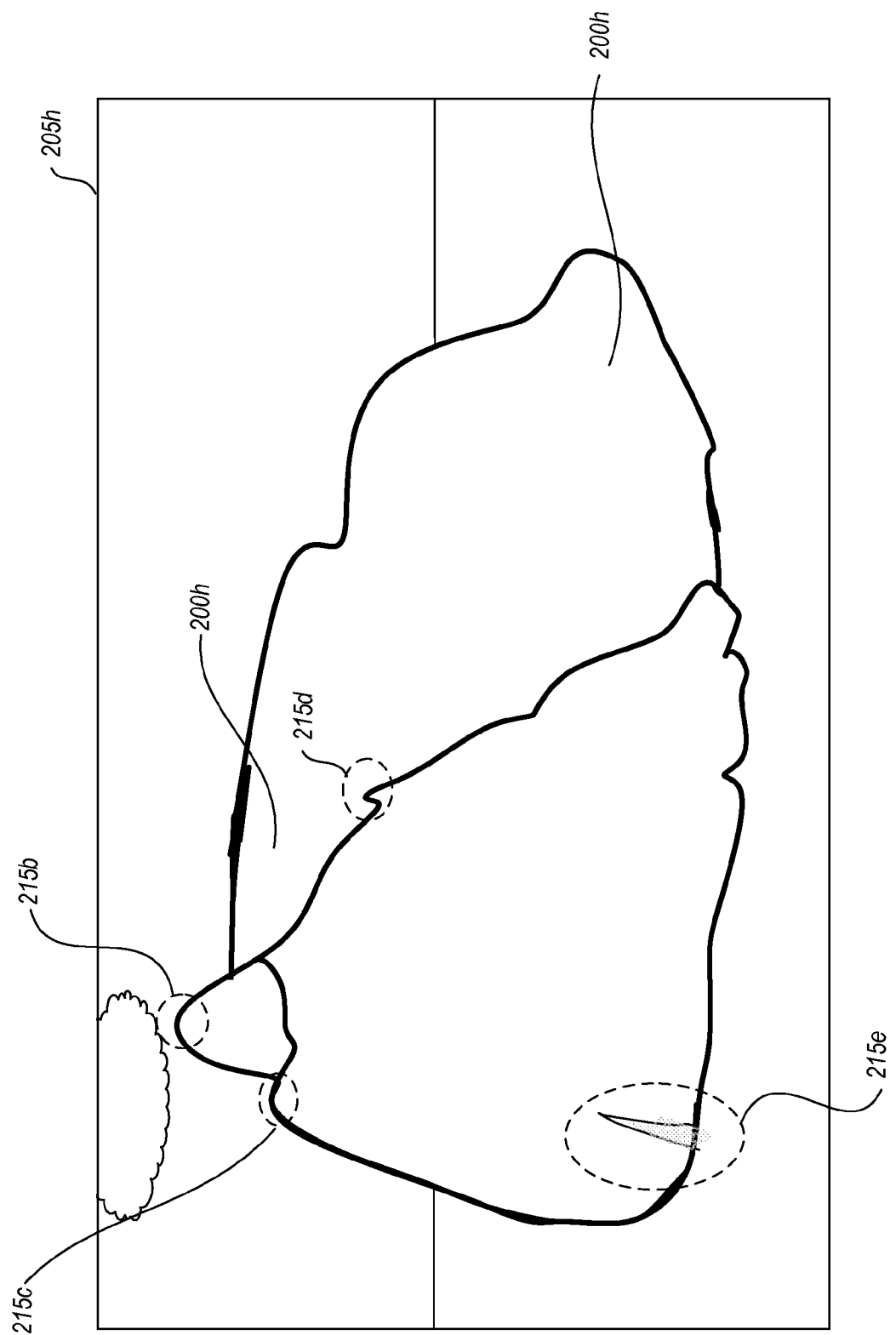

FIG. 2H continues the examples of FIGS. 2A-2G, and illustrates an example image 205h that corresponds to object 200 from an additional location, such as from location 120c of FIG. 1. In this example, it can be seen that feature 215a is no longer visible due to the change in the view, such as based on other portions of object 200 obscuring those features, and additional portions 200h of the object 200 are shown relative to that of image 205a. Accordingly, when selecting images for the group to represent the object 200, and if image 205a is selected as an initial starting image, images 205d, 205e, and 205h of FIGS. 2D, 2E, and 2H, respectively, may not be chosen as a next selected image for the group for different reasons. As previously noted, image 205e may be discarded to its quality problems, while image 205d may not be chosen due to its relative lack of additional information compared to image 205a (due to the small change in location from which the additional image is acquired). Conversely, image 205h may not suffice as a next image in the group after image 205a due to a relative large change in location for the two images, including to lose the ability to map features such as 215a between images 205a and 205h due to the change in location.

Thus, in the examples of FIGS. 2A-2H, image 205g of FIG. 2G may be selected as the second image to include in the selected group to represent the object 200, after that of image 205a of FIG. 2A, and additional images may be further selected from other views 200 (e.g., to select image 205h as a next image after image 205g), so as to include further overlapping portions that, in aggregate, include all of the exterior of the object. It will be appreciated that the selection of various images may be performed in various manners and using various techniques, as discussed in greater detail elsewhere.

It will be appreciated that the details discussed with respect to the examples of FIGS. 2A-2H are provided for illustrative purposes, and that the described techniques are not limited to these example details.

Figure 3:
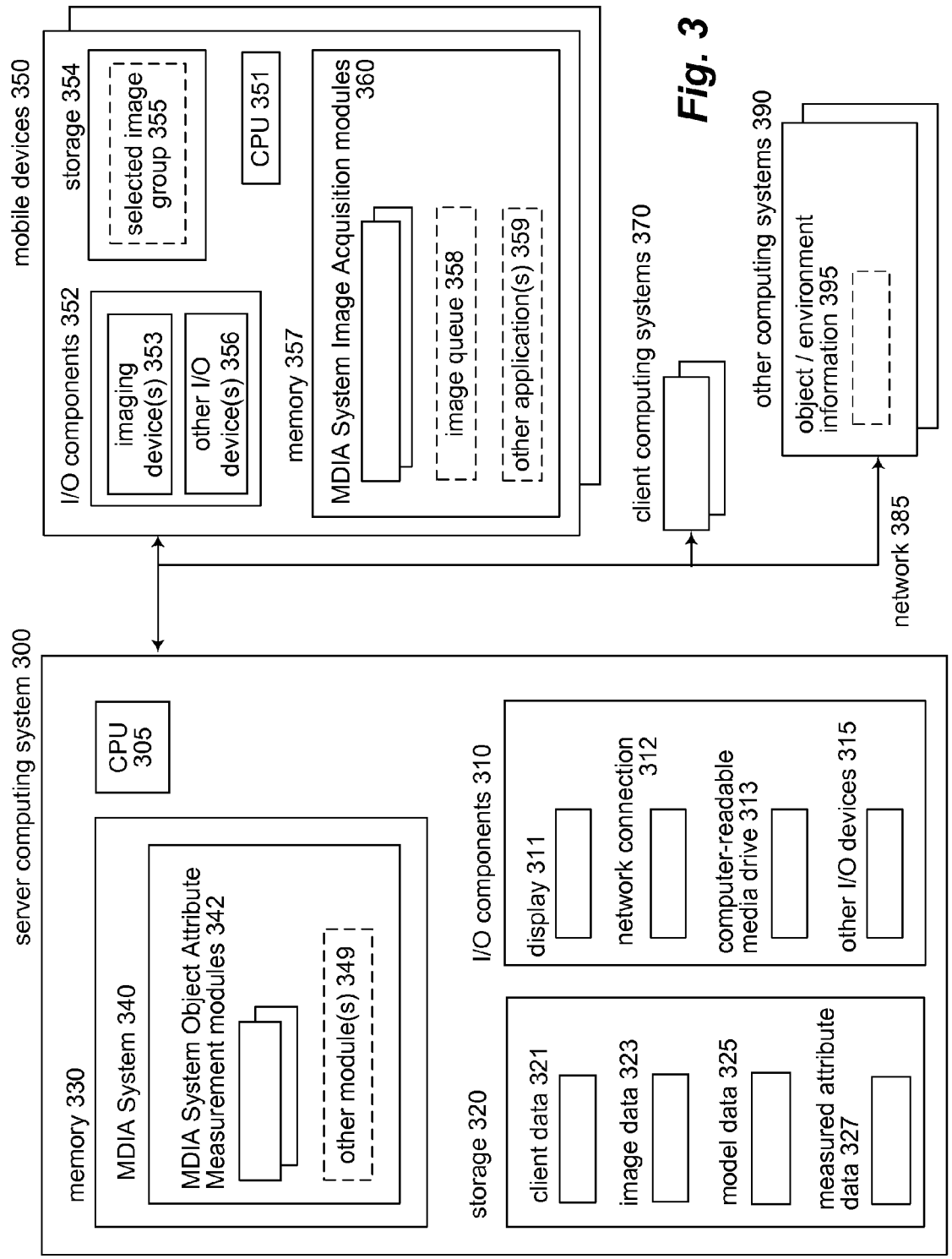
FIG. 3 is a block diagram illustrating a computing system suitable for executing embodiments of a described system for analyzing images acquired via mobile devices to assess volume and/or other attributes of objects included in the images.

FIG. 3 is a block diagram illustrating an embodiment of a server computing system 300 that is suitable for performing at least some of the described techniques, such as by executing an embodiment of a MDIA system 340 that provides a mobile device image analysis service available to various clients. The example server computing system 300 includes one or more central processing unit ("CPU") processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.)—such I/O components may enable a variety of types of interaction types, including, for example, voice control, gesture control, etc.

One or more mobile devices 350 are similarly illustrated as each having one or more CPU processors 351, one or more I/O components 352, memory 357, and storage 354. For example, each such mobile device may include one or more image capture devices 353 and other I/O devices 356, although particular such other I/O devices are not illustrated. In this example, one or more MDIA system image acquisition modules 360 are executing in memory 357 of the mobile device (e.g., as part of one or more software applications provided by the MDIA system 340 or the entity operating the system 340), such as one or more of the image acquisition modules 168 of FIG. 1—one or more other software applications 359 may also optionally be executing on the mobile device (e.g., to allow wireless communication with the server computing system 300 and/or other systems). As the mobile device performs image acquisition capabilities, it may optionally create and use a temporary image queue 358 in memory as part of performing image selection activities, and/or may store some or all of the acquired images on storage 354—in this example, the storage 354 may optionally include multiple images selected for an image group 355 to represent an object whose images are being acquired.

The other computing systems 370 and 390 may similarly include some or all of the same types of components as the server computing system 300 and/or mobile devices 350, but such components are not illustrated in this example for the sake of brevity. The server computing system 300 and mobile devices 350, and the MDIA system 340 and the system 340 modules 342, 349 and 360, may also communicate with each other and/or other computing devices and systems in various manners, including via one or more networks 385 (e.g., the Internet, one or more cellular telephone networks, etc.).

In the illustrated embodiment, at least a portion of the MDIA system 340 is executing in memory 330 of the server computing system 300, and in this example includes one or more MDIA system object attribute measurement modules 342, such as one or more of the object attribute measurement modules 169 of FIG. 1—one or more other modules 349 (e.g., MDIA system image acquisition modules) and/or other software applications (not shown) may also optionally be executing in the memory 330, including in some embodiments to execute all of the MDIA system on the server computing system. Similarly, while not illustrated in this example, in other embodiments, all of the MDIA system may optionally execute in the memory 357 of a mobile device, such as to enable the mobile device to perform all of the described techniques without interacting with the server computing system 300. Additional details are discussed elsewhere herein related to types of automated operations that various of the MDIA system modules may perform. The system 340 and/or the system modules 342, 360 and 349 may in some embodiments include software instructions that, when executed, program or otherwise configure the processor(s) 305 and the server computing system(s) 300, and/or the processor(s) 351 and the mobile device(s) 350, to perform automated operations that implement at least some of the described techniques.

The MDIA system 340 and its modules may obtain and use various information as part of its automated operations, such as client data 321, image data 323, model data 325 and measured attributed data 327 on storage 320 of the server computing system 300—such data and its use may be similar to that described with respect to data 161-164 of FIG. 1 and/or elsewhere herein. For example, the MDIA system 340 may obtain various types of client-related information from users or other entities that act as clients of the system 340, such as by interacting with corresponding client computing systems 370 (e.g., via a corresponding optional module 349 that enables clients to register with the system 340 and/or to provide other types of client-specific information), and may store some or all such information in client data 321 on storage 320. While not illustrated here, in other embodiments some or all of the MDIA system 340 may execute on behalf of a single client or a single entity (e.g., an organization with multiple employees or other members). In addition, the MDIA system may further obtain and use additional types of data in at least some embodiments, such as information about particular objects, object types (e.g., materials) and/or object environments from one or more other computing systems 390. Such other information may be used in various manners when analyzing images, determining object attribute measurements and/or presenting corresponding information to clients, as discussed elsewhere herein.

It will be appreciated that the illustrated computing systems and device are merely illustrative and are not intended to limit the scope of the present invention. For example, computing system 300 and/or mobile devices 350 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its modules may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system modules may in some embodiments be combined in fewer modules or distributed in additional modules. Similarly, in some embodiments the functionality of some of the illustrated modules may not be provided and/or other additional functionality may be available.

Thus, in at least some embodiments, the illustrated modules and/or systems are software-based modules/systems including software instructions that, when executed by the CPU(s) 305 and/or CPU(s) 351 and/or other processor means, program the processor(s) to automatically perform the described operations for that module/system. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is an example flow diagram of an illustrated embodiment of a MDIA (Mobile Device Image Analysis) System routine 400. The routine may be provided by, for example, execution of an embodiment of the MDIA System 160 of FIG. 1, the MDIA System 340 of FIG. 3, and/or the MDIA System discussed with respect to FIGS. 2A-2H, such as to perform activities for clients of a MDIA Service being provided by the MDIA System, including to acquire and analyze images via mobile devices to estimate measurements for one or more attributes of an object included in the images. It will be appreciated that the routine 400 may be performed by one or more configured devices or systems, including in multiple locations, such as if a mobile device used to acquire images performs at least some of the portions of the routine 400, while one or more remote server systems perform additional portions of the routine.

The routine begins in block 405, where instructions or information is received. The routine continues to block 410 to determine whether an instruction is received to register a new client of the MDIA Service and/or to modify existing information for such a client, and if so continues to block 415 to obtain corresponding client information and to perform a registration for the client. In at least some embodiments, the client information obtained may include information about, for example, payment mechanisms (e.g., if the MDIA Service is a fee-based service that charges clients for particular activities performed), notification preferences or other instructions (e.g., for use in providing information to a client about one or more analyzed attributes for an object of interest to the client, such as based on images of the object supplied by the client), and/or other types of client preferences and information (e.g., mobile devices that are registered for the client to provide image information, user representatives of the client who are authorized to perform particular activities, etc.). While not illustrated in this example routine, the routine may further, in at least some embodiments, provide one or more user interfaces via which a user representative of a client may interact with the MDIA System, such as to provide a GUI ("graphical user interface") via which the authorized user representative may perform activities (e.g., to register a client and/or obtain information about previous activities performed for the client). Such a GUI or other user interface may, for example, be provided over the Internet or other network to one or more computing devices of the client's user representative, such as via a Web browser executing on those client devices, and/or may be provided at least in part by an application program of the MDIA System that is downloaded to and executed on a mobile device or other configured device of the client's user representative (e.g., a client-side application that includes one or more modules of the MDIA System, such as modules 360 of FIG. 3).

After block 415, or if it is instead determined in block 410 that the information or instructions received in block 405 are not to register client information, the routine continues to block 420 to determine whether instructions or information have been received related to performing image acquisition for one or more objects of interest, such as on behalf of a client that has just been registered in block 415 or instead for a previously registered client. For example, such a received indication may be based on a human user indicating via a mobile device or other configured device to the MDIA System that an image acquisition session is about to begin for one or more objects of interest, based on such a mobile device beginning to supply one or more acquired images as part of a new image acquisition session, based on the MDIA System providing a reminder or other instructions to a human user to begin an image acquisition session (e.g., in accordance with previously defined instructions for a corresponding client), etc. If so, the routine continues to block 430 to execute an MDIA System Image Acquisition routine, such as by executing one or more image acquisition modules of the MDIA System. One example of such an MDIA System Image Acquisition routine is discussed in greater detail with respect to FIGS. 5A-5B.

After block 430, or if it is instead determined in block 420 that the instructions or information received in block 405 are not related to performing an image acquisition session, the routine continues to block 440 to determine whether the information or instructions received in block 405 correspond to calculating or otherwise estimating one or more attribute measurements for one or more objects of interest, such as for images just acquired with respect to block 430 or instead with respect to previously acquired and stored images. If so, the routine continues to block 450 to perform an MDIA System Object Attribute Measurement routine, such as by executing one or more object attribute measurement modules of the MDIA System. One example of such an MDIA System Object Attribute Measurement routine is illustrated in greater detail with respect to FIG. 6.

After block 450, or if it is instead determined in block 440 that the instructions or information received in block 405 are not related to performing attribute measurements, the routine continues to block 460 to determine whether the instructions or information received in block 405 include providing measured attribute information to a client and/or other source, whether for attribute measurements just performed with respect to block 450 or instead for previously determined object attribute information. If so, the routine continues to block 470 to retrieve corresponding information of interest, to optionally format the information in an indicated manner, and to provide to the client. As previously noted, in some embodiments, the providing and/or formatting of information for a client may be performed in manners previously indicated by the client, such as with respect to preferences specified by the client. In addition, in at least some embodiments, the providing of the information in block 470 includes generating one or more reports to provide the information of interest, with such reports being able to be provided to the client in various manners (e.g., an electronic report sent over one or more networks via one or more electronic communications, a paper-based report, etc.).

If it is instead determined in block 460 that the information or instructions received in block 405 are not to provide measured attribute information, the routine continues instead to block 490 to perform one or more other indicated operations as appropriate. For example, the operations performed with respect to block 490 may include requesting or otherwise receiving additional information of one or more types about objects and/or their environments, with such additional information optionally being used as part of blocks 430 and/or 450. In addition, in some embodiments, a client may be able to perform a variety of other types of actions with respect to the MDIA System, such as to schedule notifications or activities for future times, to retrieve and monitor information about previous activities, etc. In addition, the MDIA System may provide its corresponding services on a fee basis for at least some types of activities performed by clients in at least some embodiments, and if so the operation's performed with respect to block 490 may include requesting and/or obtaining payment from clients for such activities, including for activities performed with respect to blocks 430, 450, and/or 470.

After blocks 470 or 490, the routine continues to block 495 to determine whether to continue, such as until an explicit indication to terminate is received. If it is determined to continue, the routine returns to block 405, and otherwise continues to block 499 and ends.

Figure 5A:
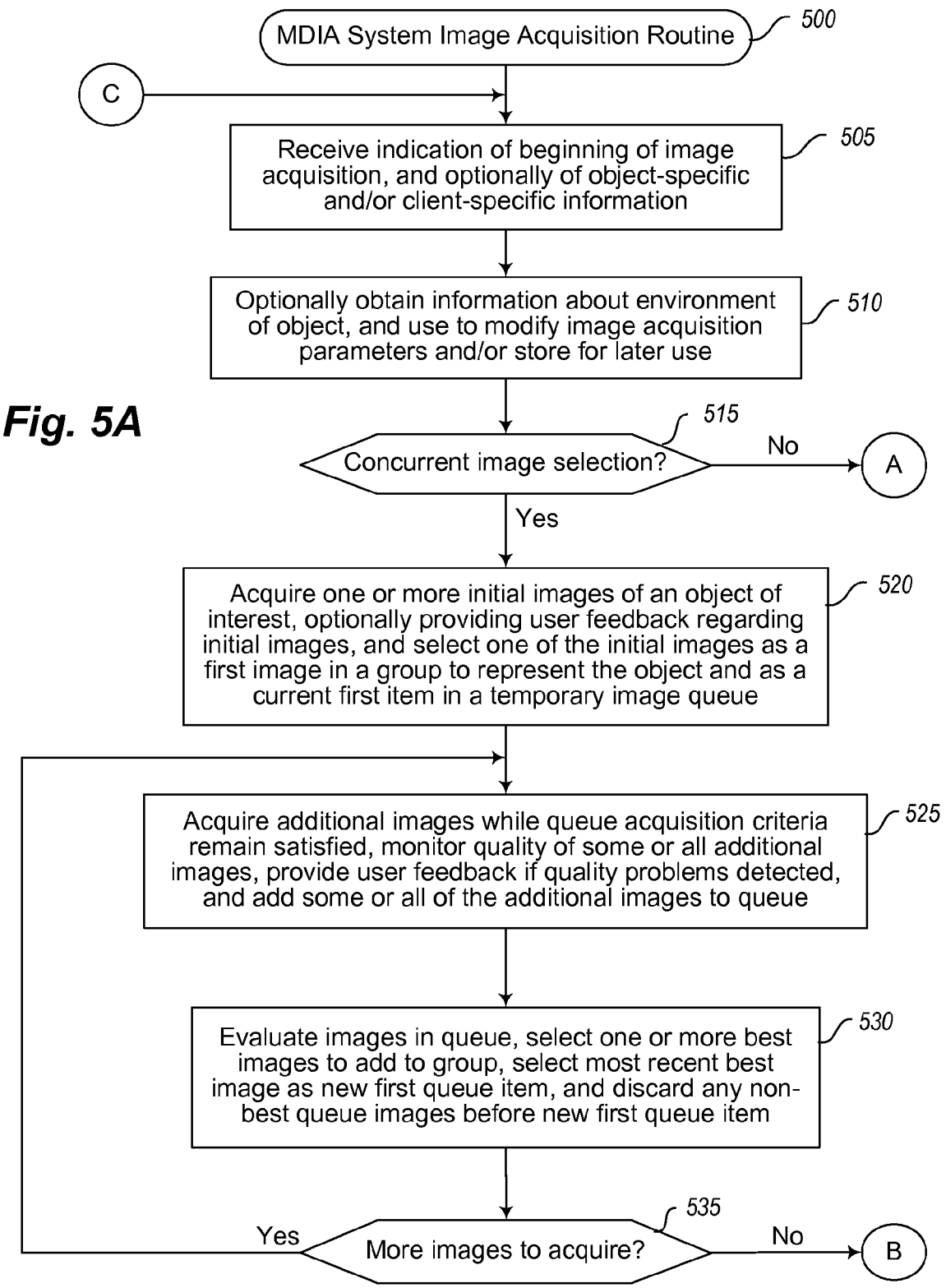
FIGS. 5A-5B are an example flow diagram of an illustrated embodiment of an MDIA System Image Acquisition routine.
Figure 5B:
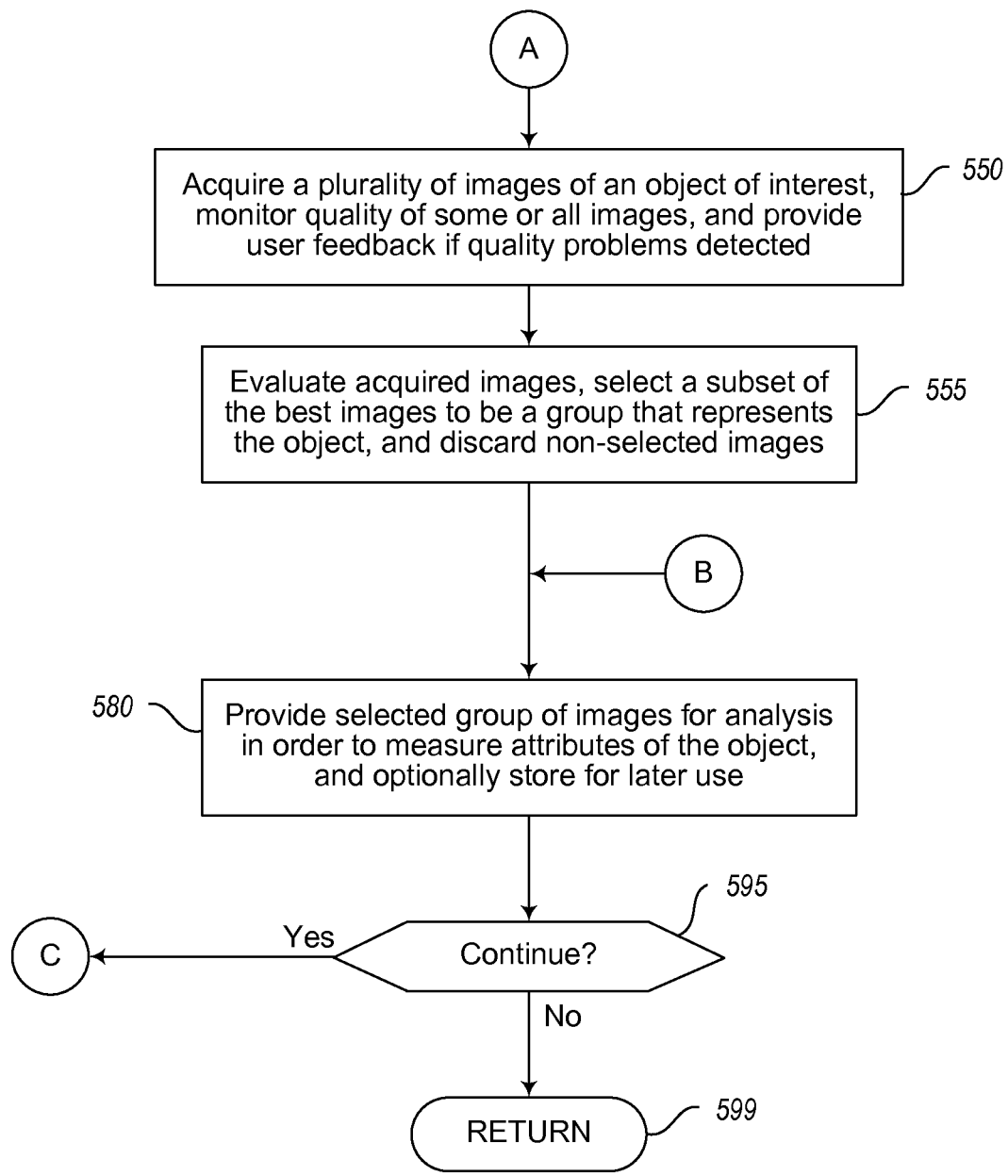

FIGS. 5A and 5B are an example flow diagram of an illustrated embodiment of a MDIA System Image Acquisition routine 500. The routine may be performed by, for example, the MDIA System 160 of FIG. 1, one or more of the MDIA System Image Acquisition modules 360 of FIG. 3, and/or the MDIA System discussed with respect to FIGS. 2A-2H, such as to perform an image acquisition session that involves acquiring a variety of images of one or more objects of interest via one or more mobile devices, selecting at least some of the acquired images to be a group that represents the objects of interest for additional processing, and optionally providing user feedback to a human user operator of the mobile device(s), including based on monitored image quality. The routine may be invoked in various manners in various embodiments and situations, including with respect to block 430 of FIG. 4. In the illustrated embodiment, a plurality of images are acquired in a session, and a subset of those images are selected to be the group representing one or more objects of interest, although in other embodiments all acquired images may be selected and used as such a group. In addition, in the illustrated embodiment, the image selection may be performed dynamically and concurrently with the image acquisition or may be performed after all of the images have been acquired, although in other embodiments only one of these two image selection alternatives may be used.

In the illustrated embodiment, the routine 500 begins at block 505, where an indication is received (e.g., from an operator of a mobile device) of a beginning of an image acquisition session, and other object-specific and/or client-specific information may further be obtained and associated with the acquired images in at least some embodiments. For example, in embodiments in which the MDIA System provides services to multiple clients, a current mobile device operator may verbally or otherwise indicate a client identifier or other indication of a current client with which the images are to be associated, although in other embodiments, the later transmission or other providing of the images to a remote server for further processing may instead include such client-related information (e.g., based on a mobile device performing the transmission). In a similar manner, the mobile device operator may include a tag or other information related to one or more objects of interest to be acquired in the images, such as to assist in later identifying those specific objects (e.g., if a variety of objects exists and will each be acquired in successive image acquisition sessions).

After block 505, the routine continues to block 510 to optionally obtain information about the environment of the object, such as light levels, location, elevation, a deviation from level (if any) of a base surface on which the object of interest rests, etc. While not illustrated here, in some embodiments, such information may further be used in various manners, including to automatically adjust parameters or settings to be used for the image acquisition by the mobile device, as part of later registering the images and a resulting model with respect to location, scale, and/or orientation, etc. The obtained information about the environment in block 510 may further in some embodiments include information about a scale of an object of interest, a distance from the operator to the object, etc., whether measured by one or more capabilities of the mobile device or other equipment at or near the operator, or instead by using artificially introduced objects or information to enable such information to later be determined (e.g., a marker or target or object of known length, height, degree of level, etc.).

After block 510, the routine continues to block 515 to determine whether to perform selection of the group of images for the object concurrently with their acquisition, or instead after all of the images have been acquired. If it is determined to perform the image selection concurrently during image acquisition, the routine continues to block 520, where one or more initial images are acquired for an object of interest, and one of the initial images is selected as a first image in the group, as well as a current first item in an image queue to be used to temporarily store images being acquired until selected images are determined. The operations in block 520 may further include monitoring quality or other aspects of the initial images in some embodiments and situations, such as to ensure that they satisfy one or more minimum thresholds or other minimum standards for the images to include in the group, as well as to optionally provide user feedback to the user if the initial images are not sufficient (to enable reacquisition of additional initial images until a satisfactory image is obtained). In some embodiments, the evaluation or the analysis of the initial images may include determining image aspects such as contrast, sharpness, lighting levels, etc., as well as to identify particular object features for use in later image selection.

After block 520, the routine continues to blocks 525-535 to repeatedly acquire additional images until one or more of those additional images are selected for the group, with other of those additional images being discarded from further use in at least some embodiments and situations. In particular, in block 525, the routine continues to acquire additional images until one or more queue acquisition criteria are reached (e.g., based on a quantity of images, amount of time, amount of distance traveled by the operator, amount of difference between two or more images in the queue, loop closing, etc.). After each of some or all of the additional images are acquired, a quality and/or other aspects of the image is monitored in this embodiment, such as to enable images that do not satisfy minimum thresholds or minimum satisfaction criteria to be discarded from the queue (or not placed in the queue) and/or to enable user feedback to be provided to the user regarding the problems with the images being acquired (e.g., to enable the user to improve the quality of future images that are acquired, whether at different locations or to reacquire one or more of the images that were not satisfactory).

After block 525, the images that are currently in the queue are evaluated, such as to enable one or more of the best images to be selected to be added to the group, based on one or more determined metrics used for the evaluation (e.g., contrast, relative motion between two or more images, lighting levels, coverage of some or all of the object, overlap with one or more prior selected images of the group, etc.). The selection of the best images and/or the determination of when the queue acquisition criteria are satisfied may be performed in various manners in various embodiments, as discussed in greater detail elsewhere herein, including based at least in part on tracking object features across multiple images (e.g., to determine when particular features are no longer present). After one or more such best images are selected, the selected best images are added to the group, and other item images in the queue before the most recent such best image are discarded in the illustrated embodiment, although in other embodiments such other images may be retained but not included in the group. After block 530, the routine continues to block 535 to determine whether there are more images to acquire in this session, such as until an entire exterior of one or more objects of interest has been captured, or otherwise until the image acquisition session is determined to be completed. If there are more images to acquire, the routine returns to block 525, and otherwise continues to block 580. Furthermore, after the image acquisition session is completed, various types of housekeeping operations may be performed, such as to delete the temporary queue, to remove some or all of the acquired images from the mobile device (e.g., after they are provided to a remote server in block 580), etc.

If it is instead determined in block 515 that the image selection will occur after all of the images have been acquired, the routine continues instead to block 550, where a plurality of images are acquired of an object of interest, and in block 555 are evaluated to select a subset of the best images to use as the group to represent the object. The selection of the best images may be performed in various manners in various embodiments, as discussed in greater detail elsewhere herein, including by generating graph information corresponding to overlapping images and doing a least-cost path traversal of the graph. In the illustrated embodiment, the non-selected images are discarded, although in other embodiments may be retained but not included in the selected group. As part of the acquisition in block 550, the routine may in some embodiments perform monitoring of image quality or other attributes, and/or provide corresponding user feedback, in a manner similar to that discussed with respect to blocks 520 and 525.

After block 555, the routine continues to block 580, where the selected group of images from the concurrent or non-concurrent image selection processes are provided as output of the routine for additional analysis in order to measure one or more attributes of the object, with such images optionally being stored for later use. As discussed in greater detail elsewhere, in some embodiments, some or all of the image acquisition activity discussed with respect to routine 500 may occur on one or more mobile devices that are used to acquire the images, such as under control of one or more modules of the MDIA System (e.g., as part of a client-side application executing on the mobile devices), and if so, the providing operations performed in block 580 may include transmitting or otherwise providing the selected group of images to one or more remote server systems, although in other embodiments, all operations of the MDIA system may be performed by one or more configured devices (e.g., by the mobile device) without such transmittal to a remote server system.

After block 580, the routine continues to block 595 to determine whether to continue, such as until an explicit indication to terminate is received, or instead based on the completion of the routine after an invocation performed by another routine (e.g., such as in block 430 of FIG. 4). If it is determined to continue, the routine returns to block 505, and otherwise continues to block 599 and returns.

Figure 6:
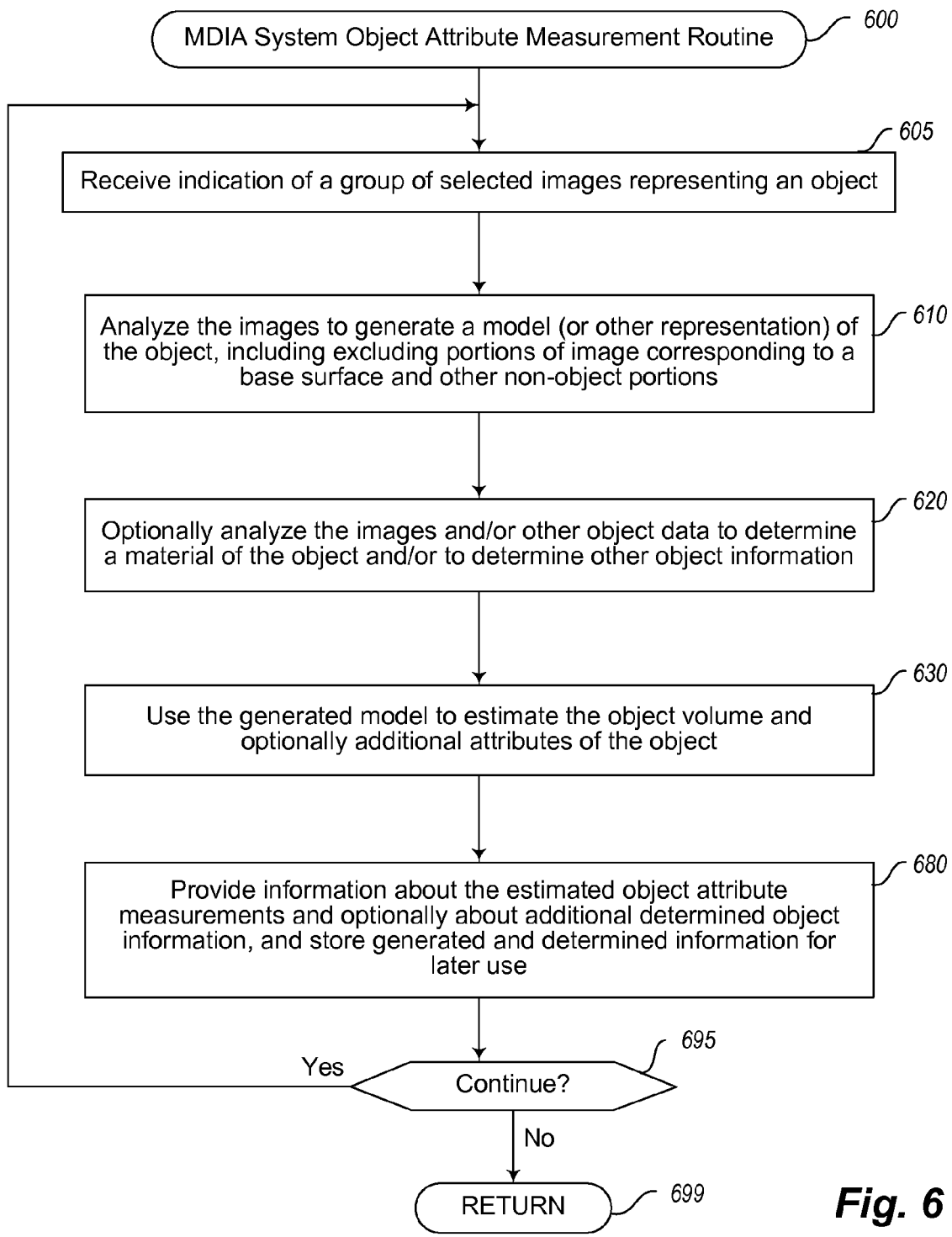
FIG. 6 is an example flow diagram of an illustrated embodiment of an MDIA System Object Attribute Measurement routine.

FIG. 6 is an example flow diagram of an illustrated embodiment of a MDIA System. Object Attribute Measurement routine 600. The routine may be performed by, for example, execution of the MDIA System 160 of FIG. 1, the MDIA System Object Attribute Measurement modules 342 of FIG. 3, and/or the MDIA System discussed with respect to FIGS. 2A-2H, such as to analyze a selected group of images that represents an object in order to determine one or more measurements for attributes of interest for the object, as well as to provide corresponding information to a client. The routine 600 may be invoked in various manners in various embodiments and situations, including with respect to block 450 of FIG. 4. In addition, while the illustrated embodiment of the routine 600 includes generating a model and using that model to measure attributes of interest, the attribute measurement activities may be performed in other manners in other embodiments.

The routine 600 begins at block 605, where an indication is received of a group of selected images that represent one or more objects of interest. The routine continues to block 610 to analyze the images to generate a model or other representation of the object, such as by generating a point cloud model in which portions of the images of the selected group that correspond to the object are separated from other portions of the images that are not part of the object (e.g., part of a base plane or other base service on which the object rests). The generating of the point cloud model may be based at least in part on tracking particular object features through multiple of the selected images, and using such information from the multiple images to determine relative 3D location of each feature with respect to one or more other features.

After block 610, the routine continues to block 620 to further optionally analyze the images and/or other object data corresponding to the object or its environment to determine additional information about the object, such as to determine the material of the object. In block 630, the routine then uses the generated model to estimate the object volume, and to optionally calculate or otherwise estimate measurement values for other attributes of the object, such as contour lines or other surface area information, weight, radioactivity, etc.— such attribute measurement estimation may in some situations involve information determined in block 620, such as to use a determined type of material and other information about a unit weight for the material by volume to determine the weight of the overall object based on its estimated volume and determined material type. In some embodiments, the operations performed with respect to one or more of blocks 610, 620, and 630 may further include further manipulating or modifying the generated model in various manners, such as to fit a bare earth model and/or a surface model to the point cloud model. In other embodiments, other types of models may be determined and used.

As one specific example, the calculation of volume of an object may be performed based on measuring the amount of space between the surface of the pile and the ground it sits on, referred to generally in this specific example as the top and base surfaces, respectively. For example, even if the object is irregular and/or porous (e.g., a stockpile of construction aggregate materials) or the surfaces are otherwise approximate, the object may be modeled as having a fixed surface. Thus, the top and base surfaces may be treated as meeting along a boundary (e.g., to form a watertight solid that approximates the shape and volume of the pile), with this boundary referred to as the tope in this specific example. The solid may, for example, be represented with a boundary model formed of the two surfaces in polygonal or parametric form, or as a volumetric model such a 2½D height fields or a 3D voxel grid. The model may contain the pile itself, as well as optionally containing parts of the surrounding environment.

Using such a model, the volume computation may start with a step that segments the model into two components, with the first component containing the part of the model that represents the object, and the second component containing the remainder of the model. If the model is volumetric (such that the volume can be computed directly), then the object volume is obtained by computing the volume of the object component. Otherwise, the object component may be further segmented to isolate the top surface, base surface and toe components. In some embodiments, the model may be generated in the form of a 3D point cloud. The points of such a 3D point cloud model may be sampled from the top surface, the toe, and the surfaces of the surrounding environment, while the base surface is not sampled due to being a contact surface. The point cloud may, for example, be expressed in a Cartesian coordinate system, where the local vertical is aligned with the z up axis (i.e. pointing away from the center of the Earth, for an object resting on the ground). Given an object point cloud, the corresponding volume may be computed first by segmenting the points into top surface, toe and environment components. Then, z-aligned height fields may be fitted to the toe and surface components (e.g., in a smooth and statistically robust manner). Finally the object volume may be obtained by computing the integral of the difference between the top and toe fields. Alternatively, if a bare earth model of the environment (e.g., of the base surface on which the object sits) is available, then the volume may be obtained by computing the integral of the difference between the top field and a field derived from the bare earth model. If the object rests on complex terrain or man-made structures, then 3D models of these structures may be used to aid segmentation and field fitting. The models may be pre-existing or derived from the same point cloud. Finally, the point cloud may be pre-processed prior to segmentation. Pre-processing may include de-noising, removal of artifacts, simplification, scaling, leveling, geo-referencing, etc. Such artifacts may, for example, represent data that is added to one or more images but does not have a corresponding source in the object or environment, such as for artificially introduced data based on an imaging error or other problem, as described in greater detail elsewhere herein. The point cloud may also, in some embodiments and situations, contain reflectance and/or color information, and/or other meta-data that may be used volume computation. While the volume computation process may be fully automated in some embodiments and situations, in other embodiments and situations some human input may be provided as part of the process.

After block 630, the routine continues to block 680 to provide information about the estimated object attribute measurements as output of the routine, such as to another routine from which the routine 600 was invoked (e.g., routine 400). The routine optionally includes additional determined object information from block 620 as well in the provided information, and further stores the generated and determined information for later use.

After block 680, the routine continues to block 695 to determine whether to continue, such as until an explicit indication to terminate is received, or instead based on the completion of the routine after an invocation performed by another routine (e.g., such as in block 450 of FIG. 4). If it is determined to continue, the routine returns to block 605, and otherwise continues to block 699 and returns.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

As discussed above, embodiments of the MDIA System may perform a variety of activities in a variety of manners in various embodiments. One or more specific example embodiments are discussed in greater detail below for an example volume measurement service, but it will be understood that the invention is not limited to the exemplary details provided (e.g., may be used with a service that measures various surface attributes, whether in addition to or instead of volume).

A volume measurement service may be provided for stockpiles or other objects. To perform a volume measurement, a user initiates a dataset acquisition session by identifying the location of the stockpile and the material (e.g., aggregate) it contains. The identification may be done manually or with some degree of automation. For example, positioning methods (satellite, marker, 3D model) can compute the location. Image-based recognition methods can be used to identify the material, such as via texture recognition.

The user walks around the pile while capturing video or images of it. In general, one loop around the pile is enough to image the whole pile. The mobile acquisition platform may use lightweight photogrammetry processing to ensure correct capture, such as to warn the user during the capture if the captured video/images are insufficient for 3D reconstruction. After the user stops the capture, the application starts uploading the dataset to a reconstruction server/cloud. This is done through the cell phone network, a wireless network or through a connection established by a local PC.

The configured device(s) supporting the volume measurement service may then perform automated operations to implement a photogrammetry pipeline that reconstructs the stockpile and yields a point cloud model. Then the point cloud is automatically oriented and scaled, such as based on GPS metadata recorded with the frames. In some cases, data of one or more types are provided by multiple distinct devices and/or sensors in the environment of the object (e.g., at one or more locations near or on the object), including to use a combination of multiple types of data and/or differential information of a single type from multiple devices to further refine and improve metadata associated with the object. Finally, a volume computation module fits bare earth and surface models over the point cloud to derive the pile volume and contour lines of the pile. The data may then be compiled into a report and posted on a web server for the user to retrieve it.

As one example of an architecture for an MDIA system that provides such a volume measurement service, photogrammetric reconstruction software that is used may be distributed between a mobile device for image acquisition and one or more remote server computing systems. The software is split into two primary logical components or sub-systems, as follows: one or more image acquisition modules (e.g., hosted on the mobile device), and one or more object attribute measurement modules used for reconstruction (e.g., hosted on the one or more remote server computing systems, and also referred to as a 'reconstruction module' herein)—the distribution between the mobile device and server computing system(s) may be performed based on various factors, such as the respective processing capabilities and the available network bandwidth (e.g., as processing power increases on mobile devices, larger portions of the system activities may be performed on the mobile device used for image acquisition. In addition, the image acquisition module(s) may have a user interface that allows the user to operate the modules on the mobile device.

Photogrammetry Pipeline

The two groups of modules may be used to form a photogrammetry-processing pipeline, and may communicate asynchronously through a wired or wireless data network, or through a PC-based network connection. Such a photogrammetry pipeline consumes imagery in the form of still images or video streams of a specific object or environment, and produces a 3D model (or other representation) of that object. The model is a representation of the object's surface in the form of points, polygonal meshes or parametric surfaces. The points and surface primitives may be colored or textured from the source imagery or a combination of source imagery and other capture data to produce a photorealistic appearance, such as for display to the user. Meta-data may further be used to register (scale, orient, and locate) the model in a given coordinate system. Alternatively, the presence of known objects in the imagery may be used for registration.

The photogrammetry pipeline may include the following steps

Pre-processing (optional)—The images are converted in a format suitable for reconstructions. They may be rectified to correct artifacts introduced by the imaging sensor, such as optical/radial distortion.

Image Selection (optional)—A subset of the images is selected to form the reconstruction problem. The selection is based on criteria such as the amount of overlap between the candidate images, and image quality (sharpness, contrast, exposure, etc.), camera motion during acquisition, scene-to-camera distance, and scene texture. Global coverage of the object's visible exterior in the collective set of selected images may be used.

3D Reconstruction—A solver establishes visual correspondences between pixels in several images and uses them as constraints to recover the relative Camera positions for the matching images and the 3D coordinates of the points underlying corresponding pixels. The solver may estimate intrinsic camera parameters, such as focal length and distortion, or it may obtain these from the metadata of the images/videos. The solver may also densify the point set, for example, by attempting to grow corresponding regions in the images. The solver may also use only camera location data, for example, from GPS or other tracking methods, such as triangulation of external signals to solve for the final camera geometry.

Post-Processing (optional)—The point set may be registered in a known coordinate system. It may be converted to a surface model (or other surface representation) with a meshing or surface fitting method. The resulting model may be photo textured.

Mobile Device

The mobile device may combine several sensors, including at least one imaging sensor, with a general purpose data processing and storage capability, and could have network connectivity. The device also could have a user interface in the form of any of the following or a combination of the following: a display screen, physical buttons, audio speakers, haptic effectors (vibrate), etc. The device may also have global positioning, inertial and/or magnetic sensors. Without loss of generality, a typical device would be a smart-phone, a tablet, a laptop with camera, or a handheld camera. The imaging sensor produces images with one or more channels for one or more spectral bands: infrared, visible spectrum, etc. The device may include illumination sources in the corresponding bands. The mobile device may also be able to produce depth measurements co-registered with the imagery, such as by means of structured-light, stereographic, and active ranging sensors (e.g., laser scanners).

Acquired Data

The mobile device acquires video streams or still images along with state information, such as time of day, location fixes from a global positioning system, inertial measurements (linear and angular acceleration), local earth magnetic field, etc. The imagery has one or more color channels, and may include depth information.

The data may also include metadata describing the operating parameters of the device's imaging sensor, such as frame-rate and exposure. The meta-data may also include user-provided information relevant to the field of application.

Acquisition Module

A function of the image acquisition module(s) may be to aggregate imaging and non-imaging sensor streams, locally process the data and forward it to the server to complete processing. Sensors may operate at different measurement rates. The image stream may contain sequentially acquired frames as produced by a video camera, or still images acquired according to a triggering event such as user input. The module(s) may further monitor the quality of the acquired images, such as by using a quality metric, including to provide some feedback to the user regarding the quality of the data being collected. The mobile device may in some embodiments perform an image selection function that forms the reconstruction dataset, such as if the mobile device has sufficient processing power, and otherwise such functionality may be performed by the reconstruction modules. Finally, the image acquisition modules may be responsible for transmitting the dataset to the server.

Quality Monitoring

While recording, the mobile device monitors the quality of the imagery to maximize the chances of a successful reconstruction. It uses the quality assessment to provide feedback cues to the user through the user interface. A photogrammetric solution may benefit from good coverage of the object of interest with quality images. The images preferably overlap by a certain amount to properly triangulate the structure of the object. Furthermore, the images preferably have as little blur as possible and as much contrast as possible. The limitation of imaging sensors combined with mobile device acquisition may produce artifacts that affect photogrammetric quality. Below are some possible artifacts.

Focus Blur—The sensor may produce blurry images if the object of interest is out of focus. Depth of field limitations and cycling of auto-focus are typical causes of this artifact.

Motion Blur—Rapid apparent motion of the environment may produce smeared images. This limitation is typical of imaging sensors which have a minimum exposure time per image. Low light may cause the sensor to increase that exposure and make it very sensitive to motion blur.

Lens Flare—Under certain conditions, the light from bright sources is reflected between the lenses of the sensor's optical assembly. This may cause the images to lose contrast and/or distorts colors.

Low Light and Backlight Conditions—When lighting is insufficient, the images may lose contrast and become grainy, as well as show motion blur.

Rolling Shutter—Certain cameras continuously refresh their image buffer one row at a time. The electronic shutter captures the content of the buffer into a frame asynchronously of the row update. This may produce frames that actually contain two separate images. This effect is acerbated by rapid apparent motion.

The image acquisition modules may monitor quality with two metrics in some embodiments: image relative sharpness and apparent motion. These metrics allows the modules to provide feedback cues to the user to help mitigate transient focus and motion blur, as well as low light and lens flare conditions.

Image Relative Sharpness

The modules may use a sharpness function to measure the sharpness of each acquired image, as described further below. After each image acquisition, the mean and standard deviation of the sharpness may be computed over a moving window containing the last k sharpness measures (also can perform this using all previous and the current frames). If the standard deviation exceeds a certain threshold, the module emits a sharpness warning signal. The signal causes a cue (visual, aural, etc.) to be conveyed to the user to inform the user that the sharpness of the imagery is inadequate. The signal subsides when the sharpness measure stabilizes.

Apparent Motion

Apparent motion can be measured by processing consecutive frames. The use of optical flow is one example method that can be used for such measuring, and. 3D reconstruction methods such as 'structure from motion' may similarly be used. With respect to optical flow, it is a vector field that describes the relative movement of pixels between two related images. The image acquisition modules use this construct to monitor motion blur and provide a pacing cue to the user. It also may be used to detect adverse lighting conditions that produce low contrast.

Given an optical flow method, the method is initialized with the first acquired frame. Then for each following acquired frame, the acquisition module computes the flow between this frame and the previous one. If the median or mean magnitude of the flow exceeds a preset threshold, then the module emits an excess motion signal. The signal causes a cue (visual, aural, etc.) to be conveyed to the user to inform the user that apparent excessive motion is compromising the quality of the imagery. The signal subsides when the mean or median flow drops below the threshold.

The optical flow method produces a tracking error for each of its field elements. Field elements whose error is below a certain threshold are called good field elements. For a given image, if the number of good field elements drops below a certain threshold, then the module discards the image unless the previous k images where discarded for the same reason. If the image cannot be discarded, the image becomes the new initial frame of optical flow method and the module emits a lost track signal. The signal causes a cue (visual, aural, etc.) to be conveyed to the user to inform the user that adverse lighting conditions are compromising the device's tracking function. The signal subsides when tracking resumes.

During image acquisition, the image acquisition modules may publish the mean or median flow through an apparent motion signal. The user interface translates it into a cue (visual, aural, etc.) that enables the user to control the pace the motion of the device. The cue promotes smooth motions.

Other Image Quality Measures

Other relevant image quality measures can be derived from parameters produced by the imaging sensor. For example, a low image exposure would be interpreted as producing low quality images.

Other sensors such as accelerometers can produce relevant angular and linear motion measurements. Excessive angular and linear rates caused by fast camera motion are indicators of degraded image quality because of motion bur.

Image Selection

The image selection function enables the image acquisition modules to select frames from an image stream for inclusion into the dataset that is sent to the server. This function achieves image sparsity and ensures a minimal image quality. The 3D reconstruction solver does not benefit from images that have high temporal coherence, such as consecutive frames in a stream. On the other hand, it benefits from a certain amount of overlap. The image acquisition modules may use feature tracking to measure visual changes in a scene and to decide when a new image is to be selected.

Image selection may be implemented with greedy and/or global strategies. A greedy strategy selects images as they are acquired. A global strategy operates on a complete set of images. The greedy strategy is advantageous for applications requiring online selection to, for example, minimize network usage. However the selection may be suboptimal. The global strategy allows for an optimal selection. Both strategies use scoring functions that inform their selection heuristics. These functions measure image sharpness and continuity (overlap). The latter function may use feature tracking.

Feature Tracking

Feature tracking involves computing the location of multiple visual features through a sequence of images. The features are usually salient shapes, such as corners, present in the first image of the sequence. A feature detector can be used to select the feature set. For each feature, tracking produces a sequence of image coordinates called a track. The tracks are grown by performing a tracking step between two consecutive images. There are several methods to perform the tracking step, with optical flow/sparse optical flow being one example.

Over time, the apparent changes in the scenery will cause certain features to become occluded or to exit the sensor's field of view. The corresponding tracks are dropped from the track set. Other factors such as blur, and lens flares will cause tracking failures leading to additional dropped tracks. When the tracking set is depleted below a certain size, the tracking algorithm invokes the feature detector to replenish the track set. Over time, several tracks may converge on the same feature. A de-cluttering step performed after the tracking step may prevent clumping. This step can be implemented with a non-maximum suppression algorithm where, given a fixed search radius, for each feature pair whose separation is less than the search radius, drop the shortest of the two corresponding tracks.

The feature tracking process produces a set of features $F_i$ for each image $I_i$. Each feature $f_k$ is defined by a position $pos(f_k)$ in the corresponding image and a key $id(f_k)$ that uniquely identifies the associated visual feature. Given two feature sets $F_i$ and $F_j$, their intersection $F_i \cap F_j$ is a set of matching feature pairs.

$$F_i \cap F_j = \{ \langle f_k, f_{k'} \rangle | f_k \in F_i \wedge f_{k'} \in F_j \wedge id(f_k) = id(f_{k'}) \}$$

Scoring Functions

Scoring functions may be used to measure image sharpness, continuity and other qualities.

Relative Sharpness

The relative sharpness function measures the sharpness of an image by comparing its absolute sharpness with the absolute sharpness of the neighboring frames in the image sequence. Given an image I, the absolute sharpness function s(I) is defined as the mean squared magnitude of the image gradient computed at each pixel $$s(I) = \frac{\sum_{p \in I} \|\nabla p\|^2}{|I|}$$

Given an image sequence, the neighborhood of the $i^{th}$ image $I_i$ is $$W_r(I_i) = \{I_{i-r}, \ldots, I_{i-1}, I_i, I_{i+1}, \ldots, I_{i+r}\}.$$

where r is a fixed radius.

The upstream neighborhood may be defined as $W_r^U(I_i) = \{I_{i-r}, \ldots, I_{i-1}, I_i\}$ The relative sharpness of $I_i$ is $$relS(I_i) = \frac{s(I_i) - \min(S_r(I_i))}{\max(S_r(I_i)) - \min(S_r(I_i))}$$

with $S_r(I_i) = \{s(I_j) | I_j \in W_r(I_i)\}$.

The upstream relative sharpness is $$relS^u(I_i) = \frac{s(I_i) - \min(S_r^u(I_i))}{\max S_r^u(I_i)) - \min(S_r^u(I_i))}$$

with $S_r^u(I_i) = \{s(I_j) | I_j \in W_r^u(I_i)\}$.

Alternatively the sharpness could also be analyzed in the frequency domain or a wavelet domain to identify the missing high texture frequencies. Furthermore, it could be executed only on the image part of interest (the part that is modeled in 3D), which may be more robust to any problems of depth of field in the camera.

Continuity Functions

Several functions and predicates may be defined that measure the amount of overlap between images. A continuity function $f: S^2 \rightarrow \mathbb{R}$ takes a pair of images and computes a real positive value representing the amount of overlap between these images.

Three specific continuity functions may be defined, as follows: trkCont, epiCont, and sfmCont.

trkCont computes the number of common tracking features between two frames $$trkCont(I_i, I_j) = |F_i \cap F_j|$$

epiCont computes the largest number of tracking features pairs between two frames that support an epipolar geometry solution. Epipolar geometry is a set of constraints between corresponding points in two images produced by two cameras viewing the same 3D scene. epiCont can be implemented with several epipolar methods, to produce the geometric constraints and the number of feature pairs that agree with them. Those pairs are known as epipolar inliers. epiCont produces the number of inliers.

sfmCont computes the largest number of tracking features pairs between two frames that support a solution comprising 3D positions for those features and the camera views for each image. This type of solution is produced by structure from motion techniques. A camera view includes extrinsic parameters (translation and rotation), and may include intrinsic parameters such as focal length, aspect ratio and distortion coefficients. sfmCont produces the number of inlier pairs. Other techniques, such as Simultaneous Localization and Mapping (SLAM) are suitable to compute a continuity predicate.

Given the threshold minCont, the predicate $goodCont(f, I_i, I_j)$ is true if $I_i$ and $I_j$ have a minimum continuity according to a function $f$.

$$goodCont(f, I_i, I_j) \uparrow f(I_i, I_j) \geq minCont$$

The set of images that are connected to $I_i$ according to goodCont are $$W_c^u(f, I_i) = \{I_j | I_j \in S \wedge goodCont(f, I_i, i_j) \wedge i > j\}$$

$$W_c^d(f, I_i) = \{I_j | I_j \in S \wedge goodCont(f, I_i, i_j) \wedge i < j\}$$

$$W_c(f, I_i) = \{I_j | I_j \in S \wedge goodCont(f, I_i, i_j)\}$$

They represent respectively the upstream, downstream and total set of images that have a good connectivity as defined by f:

Given the threshold minConn the predicates $$good\ W_C^u(f, I_i) \equiv |W_c^u(f, I_i)| \geq minConn$$

$$good\ W_C^d(f, I_i) \equiv |W_c^d(f, I_i)| \geq minConn$$

$$good\ W_C(f, I_i) \equiv |W_c(f, I_i)| \geq minConn$$

Identify the images whose number of upstream, downstream, and total numbers of connections according to f is larger or equal to minConn.

Let $medDelta(I_i, I_j)$ be the median displacement of the tracking features between two frames $$meDelta(I_i, I_j) = median(\{\|pos(f_k) - pos(f_{k'})\| \langle f_k, f_{k'} \rangle \in F_i \cap F_j\})$$

The following predicate is true if the median displacement between two frames falls within a preset range (minDisp, maxDisp)

$$goodDelta(I_i, I_j) \equiv medDelta(I_i, I_j) \in (minDisp, maxDisp)$$

The predicate indicates whether the median value of the apparent displacement of the tracked features is with a preset range. Alternatively, the predicate can be computed with the mean displacement.

Other Quality Metrics

Other quality functions may be applicable, including those measuring artifacts as described above.

Greedy Image Selection

This type of image selection process runs concurrently with image acquisition. It is can be a greedy iterative method that selects the best image among a moving window. The window is implemented with a queue within which incoming frames are inserted. When the window reaches a preset size, the algorithm assigns a score to each frame with a scoring function and adds the highest scoring frame to the set of selected frames. Then, the tail of the queue starting at the selected frame is discarded and the accumulation process resumes.

The scoring function may be defined as a weighted sum of individual functions.

$$\text{score}(I_i) = \sum_{j=1}^{m} \alpha_j f_j(I_i)$$

In particular, the following combination of sharpness and continuity was found to be advantageous $$\text{score}(I_i) = \begin{cases} \alpha \, relS(I_i) + \beta |W_C^u(f, I_i)| + \gamma(i-s) \\ \text{if } I_s \text{ exists} \wedge goodDelta(I_s, I_i) \wedge goodCont(f, I_s, I_i) \\ relS(I_i) \text{ otherwise} \end{cases}$$

where $I_s$ is the latest selected image, $\alpha$, $\beta$ and $\gamma$ are real values and $f$ is a continuity function such as trkCont, epiCont, or sfmCont.

Global Image Selection

This type of image selection process models the problem of selecting images as a graph search problem. The method builds a directed acyclic graph G(V, E). Each vertex represents an image in the sequence.

$$V = \{I_1, \ldots, I_n\}$$

Each oriented edge $e_{ij}$ connects two images $I_i$ and $I_j$ if they meet a given connectivity criterion $conn(I_i, I_j)$ and if i<j. The criterion's predicate is true if it can measure a certain amount of coherence between two images such as spatial coherence (scene overlap) or temporal coherence (neighboring timestamps).

$$E = \{e_{ij} | conn(I_i, I_j) \wedge i < j\}$$

Below is an illustration with a sequence of eight images, with the 'b' portion

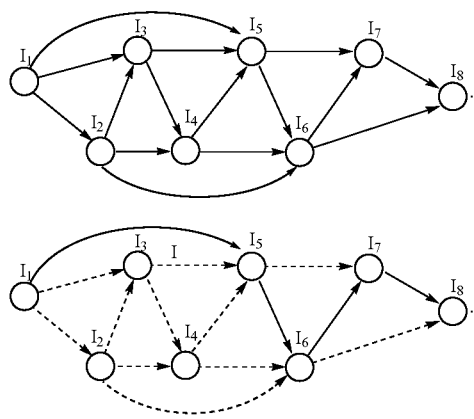

depicting a path selecting five images out of the eight.

Once the graph is constructed, the method selects the images by finding a path $p(I_1, I_n)$ through G that connects the first and last images in the sequence. There may be several valid paths. The function uses a cost function to select the best path $$p^*(I_1, I_n) = \underset{p \in P(I_1, I_n)}{\text{argmin}} \, \text{cost}(p)$$

where $P(I_1, I_n)$ is the set of all path between the first and last image.

The cost function computes for each edge the cost of consecutively selecting the images it connects. This function represents the relative goodness of the outgoing edges of an image. By extension the cost of a path is the sum of the cost of the edges it traverses.

The selection method outputs the images on the min-cost path between the first and last image. This path-finding step is performed with techniques such as Dijkstra's shortest path algorithm, or other techniques for selection of a minimal path or an approximately minimal path. In case the graph is disconnected, the method combines the images on the min-cost path between the first and last image in each connected component.

The following connectivity predicates and edge cost functions may be used $$conn(I_i, I_j) \equiv goodDelta(I_i, I_j) \wedge goodCont(f, I_i, I_j) \wedge j - i < \text{maxDt}$$

$$cost(e_{ij}) = \max(\{|pred(I)| | I \in succ(I_i)\}) - |pred(I_j)|$$

Where pred(I) and succ(I) are the set of images connected to I by incoming and outgoing edges respectively. maxDt is a strictly positive upper bound that enforces a minimum sampling rate.

cost($e_{ij}$) is designed to incentivize the path finding step to select images that have the most incoming edges.

Global Sharpness Pre-Filtering

In certain implementations, images may be pre-filtered based on their sharpness before selecting them based on their connectivity, such as if continuity functions are computationally expensive. Global sharpness pre-filtering uses the graph-based selection method described above with the following connectivity predicate and cost functions.

$$conn(I_i, I_j) \equiv I_i \in W_r(I_j)$$

$$cost(e_{ij}) = relS(I_j)$$

The radii of the image neighborhoods used for computing the relative sharpness and the connectivity predicate may be different. The graph connectivity for a given image is shown.

Encoding and Transport

The aggregated sensor stream may be encoded in a combination of

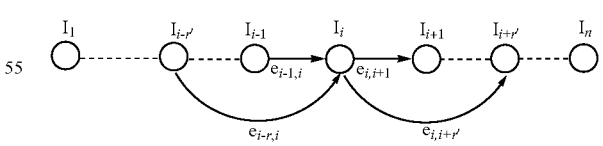

industry standard and ad-hoc data formats. For example, the frames in the image stream may be encoded as individual frames or as a compressed stream. The encoded stream is either locally stored for later transfer or sent immediately to the server through the network interface, such as via industry standard and/or ad-hoc transport protocols. Locally stored data may be transferred to an intermediate host computer that will forward it to the processing server.

User Interface

The user interface supports the operation of the image acquisition modules. It presents pages and menus to configure the modules, acquire datasets and monitor their transfer and processing. During acquisition, the interface displays the stream of images being acquired. It overlays textual and graphical information that allows the user to monitor the quality of the dataset.

Reconstruction Module

The reconstruction module is hosted on a reconstruction server. It may be composed of software components that form the remainder of the photogrammetry pipeline. It may also have workflow management components that supervise the processing of the incoming datasets. The module may further have load balancing functions that enable it to distribute reconstruction jobs among multiple processing nodes.

Processing Pipeline Architecture

The processing pipeline system is designed to handle and scale easily to process large volume of datasets. Components of the processing platform include:

Data stores: Used to store metadata, transactional data and media files

Web Server: Handles the end user interface to the system and gateway to the client acquisition devices Processing servers: Virtual machines run a workflow engine which takes a source data sets and executes various computer vision modules to generate the end user reports. The workflow engine has automatic quality management built into it based on the quality of results the data sets are reprocessed with various different parameters and settings to produce optimal end results It will be appreciated that the details discussed with respect to the example embodiments discussed above to support a volume measurement service are provided for illustrative purposes, and that the described techniques are not limited to these example details.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    acquiring, via a mobile device having image acquisition capabilities, a group of multiple images to represent an exterior of a pile of material, based on a human user carrying the mobile device around the exterior while images are being acquired, wherein the acquiring of the group of multiple images includes the human user traversing less than all of the exterior and further includes:
        selecting, by one or more configured devices, one or more initial images acquired by the human user to be part of the group of multiple images;
        while the human user carries the mobile device around a portion of the exterior, performing additional image acquisition activities for the group that include:
            after the selecting of the one or more initial images, acquiring a plurality of additional images that each includes at least one common feature on the exterior; and
            analyzing, by the one or more configured devices, the acquired plurality of additional images to identify at least one additional image to add to the group of multiple images, the analyzing further including excluding from the group at least one other image of the acquired plurality of additional images; and
        repeating the performing of the additional image acquisition activities until all of the multiple images of the group are acquired, wherein the multiple images of the group display only a subset of the exterior; and
    analyzing, by the one or more configured devices, the multiple images of the group to calculate values for one or more attributes of the pile that include a volume of the pile based on the subset of the exterior displayed in the multiple images of the group; and
    providing, by the one or more configured devices, information about the calculated values for the one or more attributes.

2. The method of claim 1 further comprising generating, by the one or more configured devices, a model of the exterior of the pile from the multiple images of the group, and wherein the calculating of the volume of the pile is further based at least in part on the generated model.

3. The method of claim 1 wherein the analyzing of the acquired plurality of additional images further includes:
    monitoring, by the one or more configured devices, quality of the acquired plurality of additional images based on one or more defined quality metrics; and
    if the monitored quality for one or more of the acquired plurality of additional images is below a determined quality threshold, providing, by the one or more configured devices, a notification to the human user, and otherwise not providing the notification.

4. The method of claim 3 wherein the performing of the additional image acquisition activities further includes determining, by the one or more configured devices, that the monitored quality for one or more acquired additional images is below the determined quality threshold, and wherein the providing of the notification to the human user includes providing information to the human user related to a type of problem with the monitored quality, to enable the human user to improve quality of subsequently acquired images of the plurality of images.

5. The method of claim 3 wherein the performing of the additional image acquisition activities further includes determining, by the one or more configured devices, that the monitored quality for one or more acquired additional images is below the determined quality threshold, and wherein the providing of the notification to the human user includes providing instructions to the human user related to re-acquiring the one or more acquired additional images whose monitored quality is below the determined quality threshold.

6. A computer-implemented method comprising:
    acquiring, via a mobile device having image acquisition capabilities, a group of multiple images to represent an exterior of a pile of material, based on a human user carrying the mobile device around the exterior while images are being acquired, wherein the acquiring of the group of multiple images includes the human user traversing less than all of the exterior and further includes:
        while the human user carries the mobile device around a portion of the exterior and acquires some of the multiple images, monitoring, by one or more configured devices, quality of the acquired some images based on one or more defined quality metrics;

determining, by the one or more configured devices, that the monitored quality for one or more of the acquired some images is below a determined quality threshold;

providing, by the one or more configured devices and based on the determining, a notification to the human user to cause quality improvement for future images acquired for the group of multiple images; and after providing the notification and while the human user continues to carry the mobile device around a portion of the exterior, acquiring the future images for the group with the quality improvement;

analyzing, by the one or more configured devices, the multiple images of the group to calculate values for one or more attributes of the pile that include a volume of the pile, wherein the multiple images of the group display only a subset of the exterior, and wherein the analyzing of the multiple images of the group includes calculating the volume of the pile based on the subset of the exterior displayed in the multiple images of the group; and providing, by the one or more configured devices, information about the calculated values for the one or more attributes.

7. The method of claim 6 wherein the acquiring of the group of multiple images further includes determining, by the one or more configured devices, that the monitored quality for one of the multiple images is below the determined quality threshold, and wherein the providing of the notification to the human user includes providing information to the human user related to a type of problem with the monitored quality, to enable the human user to improve quality of the future images related to the type of problem.

8. The method of claim 6 wherein the acquiring of the group of multiple images further includes determining, by the one or more configured devices, that the monitored quality for one of the multiple images is below the determined quality threshold, and wherein the providing of the notification to the human user includes providing instructions to the human user related to re-acquiring the one image with a higher quality.

9. The method of claim 8 further comprising generating, by the one or more configured devices, a model of the exterior of the pile from the multiple images of the group, and wherein the calculating of the volume of the pile is further based at least in part on the generated model.

10. The method of claim 9 wherein the generated model of the exterior of the pile uses at least one of a group of model types that includes a three-dimensional point cloud model, a polygonal mesh model, a volumetric model and a parametric surface model, and wherein the calculating of the volume of the pile includes applying, to the generated model, at least one of a group including a bare earth model and a surface model.

11. The method of claim 9 wherein the generating of the model of the exterior of the pile includes orienting, translating and scaling the generated model with respect to an environment surrounding the pile of material.

12. The method of claim 9 wherein the calculating of the volume of the pile includes analyzing the multiple images of the group to identify a base surface on which the pile is situated.

13. The method of claim 9 wherein the generating of the model of the exterior of the pile further includes identifying and correcting artifacts that are present in one or more of the multiple images of the group but are not present in the pile or an environment of the pile used to generate the one or more images.

14. The method of claim 6 wherein the analyzing of the multiple images of the group includes determining at least one of color, texture or a material type for the material of the pile, and wherein the determining is based on at least one of automated analysis of the multiple images of the group, use of measurements from one or more sensors in an environment of the pile of material, or input from the human user.

15. The method of claim 6 wherein the providing of the information about the calculated values for the one or more attributes includes generating a report and providing the generated report to a client, wherein the generated report includes information about the calculated volume of the pile, and wherein the providing of the generated report to the client includes at least one of electronically transmitting the generated report to the client, storing the generated report in a location accessible to the client, or printing and sending the generated report to the client.

16. The method of claim 6 wherein the monitoring of the quality of each of the acquired some images includes monitoring at least one of a level of light in each of the acquired some images, a level of contrast in each of the acquired some images, a level of sharpness in each of the acquired some images, a level of apparent movement between two or more of the acquired some images, a level of blur in each of the acquired some images, a level of exposure in each of the acquired some images, a level of focus in each of the acquired some images, or levels of one or more colors in each of the acquired some images.

17. The method of claim 6 wherein the monitoring of the quality of each of the acquired some images uses one or more sensors associated with the mobile device, and wherein the one or more sensors include at least one of a GPS sensor or an accelerometer.

18. The method of claim 6 wherein the monitoring of the quality of each of the acquired some images and the acquiring of the future images for the group is performed dynamically during the acquiring of the group of multiple images.

19. The method of claim 6 wherein the mobile device includes at least one of a cell phone having a camera, a digital camera device that acquires digital video, or a digital camera device that acquires digital still images.

20. The method of claim 6 wherein the one or more configured devices include the mobile device, and wherein the mobile device is executing one or more software applications that configure the mobile device to perform at least the acquiring of the group of multiple images.

21. The method of claim 6 wherein the one or more configured devices include at least one computing system remote from the mobile device, wherein the method further comprises receiving, by the at least one computing system, at least some of the multiple images of the group from the mobile device, and wherein the at least one computing system is configured to perform at least the analyzing and the providing of the information about the calculated values.

22. The method of claim 6 wherein the acquiring of each of at least some of the multiple images of the group is performed based on at least one of a manual image acquisition activity of the human user, of an automated image acquisition activity of the mobile device in response to one or more defined criteria being satisfied, or of extraction of individual frames from a video acquired via the mobile device.

23. A computer-implemented method comprising:
acquiring, via a mobile device having image acquisition capabilities, a plurality of images of an exterior of a pile of material, based on a human user carrying the mobile device around the exterior while the plurality of images are being acquired, the acquiring of the plurality of images including:

monitoring, by one or more configured devices, quality of each of at least some of the plurality of images based on one or more defined quality metrics; and if the monitored quality for one of the at least some images is below a determined quality threshold, providing, by the one or more configured devices, a notification to the human user to enable quality improvement for one or more subsequently acquired images of the plurality of images, and otherwise not providing the notification;

selecting, by one or more configured devices, multiple images of the plurality for use in representing the exterior of the pile, wherein the selecting of the multiple images is based at least in part on the monitoring of the quality and is performed after all of the plurality of images are acquired and further includes:

generating, by the one or more configured devices, graph information based on the plurality of images that includes graph nodes representing images and graph edges representing overlapping images, wherein each graph link between two of the nodes represents that one or more portions of the exterior of the pile are present in each image represented by the two nodes; and determining the selected multiple images by identifying a shortest path through the graph, the selected multiple images being represented by the nodes of the generated graph along the identified shortest path and being a subset of the plurality of images;

analyzing, by the one or more configured devices, the selected multiple images to calculate values for one or more attributes of the pile; and providing, by the one or more configured devices, information about the calculated values for the one or more attributes.

24. The method of claim 23 wherein the identifying of the shortest path through the graph uses a determined cost function, and wherein the determined cost function is based on at least one of levels of light in the plurality of images, levels of contrast in the plurality of images, levels of sharpness in the plurality of images, levels of apparent movement between the plurality of images, levels of blur in the plurality of images, levels of exposure in the plurality of images, levels of focus in the plurality of images, or levels of one or more colors in the plurality of images.

25. The method of claim 23 wherein the acquiring of the plurality of images based on the human user carrying the mobile device around the exterior includes at least one of the human user traversing all of the exterior a single time, the human user traversing all of the exterior multiple times, or the human user traversing less than all of the exterior.

26. The method of claim 23 wherein the one or more configured devices include the mobile device and at least one computing system remote from the mobile device, wherein the mobile device is configured to perform acquiring at least some of the plurality of images, and wherein the selecting is performed by one or both of the mobile device or the at least one computing system.

27. A system comprising:
one or more hardware processors; and
one or more modules that, when executed by at least one of the one or more hardware processors, configure the at least one hardware processor to perform at least:

initiate acquiring, via a mobile device having image acquisition capabilities, a group of multiple images of an exterior of a pile of material, based on a human user carrying the mobile device around the exterior while images are acquired, wherein the acquiring of the group of multiple images includes the human user traversing less than all of the exterior and further includes:

monitoring, by the configured at least one hardware processor, quality of each of at least some of the multiple images based on one or more defined quality metrics;

based on the monitored quality for one of the at least some images being below a determined quality threshold, providing, by the configured at least one hardware processor, a notification to enable quality improvement for one or more future images acquired for the group of multiple images; and after providing the notification, acquiring the future images for the group with the quality improvement;

analyze, by the configured at least one hardware processor, the multiple images of the group to calculate values for one or more attributes of the pile that include a volume of the pile, wherein the multiple images of the group display only a subset of the exterior, and wherein the analyzing of the multiple images of the group includes calculating the volume of the pile based on the subset of the exterior displayed in the multiple images of the group; and provide, by the configured at least one hardware processor, information about the calculated values for the one or more attributes.

28. The system of claim 27 wherein the one or more hardware processors are part of one or more computing devices that include the mobile device, wherein the one or more modules include executable software instructions, and wherein the analyzing of the selected multiple images includes generating, by the configured at least one hardware processor, a three-dimensional computer model of the exterior of the pile from the selected multiple images, and wherein the calculating of the volume of the pile is based at least in part on the generated three-dimensional computer model.

29. A non-transitory computer-readable medium having stored contents that configure one or more devices to perform a method, the method comprising:

acquiring, via a mobile device having image acquisition capabilities, a group of multiple images of an exterior of a pile of material, based on a human user carrying the mobile device around the exterior while images are being acquired at a first time, wherein the acquiring of the group of multiple images includes the human user traversing less than all of the exterior and further includes:

monitoring, by the one or more configured devices, quality of each of at least some of the multiple images based on one or more defined quality metrics;

if the monitored quality for one of the at least some images is below a determined quality threshold, providing, by the one or more configured devices, a notification at the first time during the acquiring of the multiple images to enable quality improvement for one or more future images acquired for the group of multiple images, and otherwise not providing the notification;

after providing the notification, acquiring the future images for the group with the quality improvement;

analyzing, by the one or more configured devices, the multiple images of the group to calculate values for one or more attributes of the pile that include a volume of the pile, wherein the multiple images of the group display only a subset of the exterior, and wherein the analyzing of the multiple images of the group includes calculating the volume of the pile based on the subset of the exterior displayed in the multiple images of the group; and providing, by the one or more configured devices, information about the calculated values for the one or more attributes.

30. The non-transitory computer-readable medium of claim 29 wherein the one or more configured devices include the mobile device, wherein the analyzing of the multiple images of the group includes generating, by the one or more configured devices, a model of the exterior of the pile from the selected multiple images, wherein the calculating of the volume of the pile is based at least in part on the generated model, and wherein the stored contents include software instructions that, when executed, program the one or more configured devices to perform the method.

31. A system comprising:
one or more hardware processors; and
one or more modules that, when executed by at least one of the one or more hardware processors, configure the at least one hardware processor to perform at least:
  initiate acquiring, via a mobile device having image acquisition capabilities, a group of multiple images of an exterior of a pile of material, based on a human user carrying the mobile device around the exterior while images are being acquired, wherein the acquiring of the group of multiple images includes the human user traversing less than all of the exterior and further includes:
    selecting, by the configured at least one hardware processor, one or more initial images acquired by the human user to be part of the group of multiple images;
    performing additional image acquisition activities for the group that include:
      after the selecting of the one or more initial images, acquiring a plurality of additional images that each includes at least one common feature on the exterior; and
      analyzing, by the configured at least one hardware processor, the acquired plurality of additional images to identify at least one additional images to add to the group of multiple images, the analyzing further including excluding from the group at least one other image of the plurality of additional images; and
    repeating the performing of the additional image acquisition activities until all of the multiple images of the group are acquired, wherein the multiple images of the group display only a subset of the exterior; and
  analyze, by the configured at least one hardware processor, the multiple images of the group to calculate values for one or more attributes of the pile that include a volume of the pile based on the subset of the exterior displayed in the multiple images of the group; and
  provide, by the configured at least one hardware processor, information about the calculated values for the one or more attributes.

32. The system of claim 31 wherein the one or more hardware processors are part of one or more computing devices that include the mobile device, wherein the one or more modules include executable software instructions, wherein the analyzing of the multiple images of the group includes generating, by the configured at least one hardware processor, a three-dimensional computer model of the exterior of the pile from the multiple images of the selected group, and wherein the calculating of the volume of the pile is based at least in part on the generated three-dimensional computer model.

33. The system of claim 31 wherein the analyzing of the acquired plurality of additional images further includes:
  monitoring, by the one or more configured devices, quality of the acquired plurality of additional images based on one or more defined quality metrics;
  determining that the monitored quality for one or more of the acquired plurality of additional images is below a determined quality threshold; and
  providing, by the one or more configured devices and based on the determining, a notification to the human user that includes information related to a type of problem with the monitored quality, to enable the human user to improve quality of future images of the plurality of additional images while the human user carries the mobile device around a portion of the exterior.

34. The system of claim 31 wherein the analyzing of the acquired plurality of additional images further includes:
  monitoring, by the one or more configured devices, quality of the acquired plurality of additional images based on one or more defined quality metrics;
  determining that the monitored quality for one or more of the acquired plurality of additional images is below a determined quality threshold; and
  providing, by the one or more configured devices and based on the determining, a notification to the human user that includes instructions related to the human user re-acquiring the one or more acquired additional images whose monitored quality is below the determined quality threshold while the human user carries the mobile device around a portion of the exterior.

35. A system comprising:
one or more hardware processors; and
one or more modules that, when executed by at least one of the one or more hardware processors, configure the at least one hardware processor to perform at least:
  initiate acquiring, via a mobile device having image acquisition capabilities, a group of multiple images of an exterior of a pile of material, based on a human user carrying the mobile device around the exterior while images are being acquired, the acquiring of the group of multiple images including:
    selecting, by the configured at least one hardware processor, one or more initial images acquired by the human user to be part of the group of multiple images;
    after the selecting of the one or more initial images, acquiring a plurality of additional images that each includes at least one common feature on the exterior; and
    analyzing, by the configured at least one hardware processor, the acquired plurality of additional images to identify at least one additional image to add to the group of multiple images and to exclude from the group at least one other image of the plurality of additional images, wherein the analyzing of the plurality of additional images is performed until all of the multiple images of the group are identified and further includes:

generating, by the one or more configured devices, graph information based at least in part on the plurality of additional images that includes graph nodes representing images and graph edges representing overlapping images, wherein each graph link between two of the nodes represents that one or more portions of the exterior of the pile are present in each image represented by the two nodes; and determining the additional images to add to the group by identifying a shortest path through the graph, the determined additional images being represented by the nodes of the generated graph along the identified shortest path and being a subset of the plurality of additional images;

analyze, by the configured at least one hardware processor, the multiple images of the group to calculate values for one or more attributes of the pile; and provide, by the configured at least one hardware processor, information about the calculated values for the one or more attributes.

36. The system of claim 35 wherein the one or more hardware processors are part of one or more computing devices that include the mobile device, wherein the one or more modules include executable software instructions, and wherein the analyzing of the multiple images of the group includes generating, by the configured at least one hardware processor, a three-dimensional computer model of the exterior of the pile from the multiple images of the selected group, and further includes calculating a volume of the pile based at least in part on the generated three-dimensional computer model.

37. The system of claim 35 wherein the analyzing of the acquired plurality of additional images further includes:

monitoring, by the one or more configured devices, quality of the acquired plurality of additional images based on one or more defined quality metrics;

determining that the monitored quality for one or more of the acquired plurality of additional images is below a determined quality threshold; and providing, by the one or more configured devices and based on the determining, a notification that includes information related to a type of problem with the monitored quality, to enable quality to be improved for future acquired images.

* * * * *